(12) United States Patent
Kang et al.

(10) Patent No.: US 11,503,568 B2
(45) Date of Patent: Nov. 15, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Yongjin Kang, Suwon-si (KR); Jehwan Seo, Suwon-si (KR); Geunsam Yang, Suwon-si (KR); Sanggi Oh, Suwon-si (KR); Hyungyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 17/112,117

(22) Filed: Dec. 4, 2020

(65) Prior Publication Data
US 2021/0176733 A1 Jun. 10, 2021

(30) Foreign Application Priority Data
Dec. 5, 2019 (KR) ........................ 10-2019-0160489

(51) Int. Cl.
*H04W 4/00* (2018.01)
*H04W 72/02* (2009.01)
(Continued)

(52) U.S. Cl.
CPC .............. *H04W 72/02* (2013.01); *G06F 3/14* (2013.01); *H04W 48/16* (2013.01); *H04W 72/0453* (2013.01)

(58) Field of Classification Search
CPC . H04W 72/02; H04W 72/0453; H04W 48/16; G06F 3/14; H04M 1/72519;
(Continued)

(56) References Cited

U.S. PATENT DOCUMENTS

| 9,924,513 B2 | 3/2018 | Sidhu et al. | |
| 2010/0124213 A1* | 5/2010 | Ise | H04W 12/06 |
| | | | 455/434 |

(Continued)

FOREIGN PATENT DOCUMENTS

| JP | 2017-30078 A | 2/2017 |
| KR | 10-2017-0034201 A | 3/2017 |
| KR | 10-2018-0080884 A | 7/2018 |

OTHER PUBLICATIONS

International Search Report (PCT/ISA/210) issued by the International Searching Authority in International Application No. PCT/KR2020/017391, dated Apr. 1, 2021.
(Continued)

*Primary Examiner* — Temica M Beamer
(74) *Attorney, Agent, or Firm* — Sughrue Mion, PLLC

(57) ABSTRACT

A display apparatus includes a display; a wireless communication module configured to wirelessly communicate in a first frequency band or a second frequency band; and a controller configured to control the wireless communication module to search for a radio signal transmitted from a wireless access point (WAP), to control the display to display identification information included in each of a plurality of radio signals received by the wireless communication module, and to display a message for guiding wireless communication with the WAP in the first frequency band on the display based on the user's selection of wireless communication with the WAP in the second frequency band. Accordingly, the display apparatus may guide the user's selection so as to perform wireless communication in a frequency band for optimal wireless communication based on the quality of wireless communication.

22 Claims, 15 Drawing Sheets

(51) Int. Cl.
    *G06F 3/14*     (2006.01)
    *H04W 48/16*     (2009.01)
    *H04W 72/04*     (2009.01)

(58) Field of Classification Search
    CPC ......... H04M 1/72583; H04M 1/72522; H04M 1/72547; H04M 1/0214
    USPC .......................................... 370/329; 455/566
    See application file for complete search history.

(56) References Cited

U.S. PATENT DOCUMENTS

| | | |
|---|---|---|
| 2012/0155288 A1 | 6/2012 | Kang et al. |
| 2015/0078298 A1 | 3/2015 | Barriac et al. |
| 2015/0126207 A1 | 5/2015 | Li et al. |
| 2016/0131733 A1* | 5/2016 | Do ........................ G01S 5/0226 342/378 |
| 2016/0291851 A1* | 10/2016 | Tomono .................. H04L 43/16 |
| 2017/0317877 A1* | 11/2017 | Rajapakse ............... H04L 41/08 |
| 2019/0021090 A1 | 1/2019 | Do |
| 2019/0050175 A1* | 2/2019 | Moriya ..................... H04L 5/06 |

OTHER PUBLICATIONS

Youngwoo Kim, "[Review] You're good alone, Netgear Orvi Micro RBR20 router" IP Tonga, Jan. 12, 2019, pp. 1-26 (26 pages total).

* cited by examiner

DISPLAY APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0160489, filed on Dec. 5, 2019 in the Korean Intellectual Property Office, the disclosure of which is incorporated by reference herein in its entirety.

BACKGROUND

1. Field

The disclosure relates to a display apparatus and a method of controlling the same, and for example, to a display apparatus capable of monitoring a wireless connection state with another device, and a method of controlling the same

2. Description of Related Art

In the related art, display apparatuses may refer to output apparatuses displaying visual information converted from received or stored image information to users and have been widely used in various application fields such as individual homes or places of business.

For example, the display apparatus may receive a data stream including content from various content sources such as a broadcasting station, an Internet server, an image reproducing device, a game device, and/or a portable terminal. In addition, the display apparatus may restore (or decode) an image frame from the data stream and display the restored image frame on a display panel.

Recently, a streaming service of content has been widely provided. The streaming service is a service that provides content in real time through a communication network such as an Internet.

The streaming service may be limited to a home display apparatus such as a TV, a desk-top computer, or a laptop-top computer. In addition, as the streaming service, a streaming service for advertisement may be provided to an outdoor large advertisement board using the display apparatus.

The quality of this streaming service may be greatly affected by the quality of the communication network. For example, when the quality of the communication network is deteriorated, a frame rate of a video by the streaming service may be lowered (buffered) or a resolution of the video may be lowered.

In particular, when the display apparatus is wirelessly connected to the communication network, the quality of wireless communication may greatly affect the quality of a streaming service. For example, when the quality of wireless communication is deteriorated due to interference of a radio signal or the like, the quality of the streaming service may deteriorate.

SUMMARY

Embodiments provide a display apparatus that guides a user's selection so as to perform wireless communication in a frequency band for optimal wireless communication based on the quality of wireless communication, and a method of controlling the display apparatus.

Embodiments provide a display apparatus capable of changing a frequency band for wireless communication in response to a decrease in quality of wireless communication.

Additional aspects will be set forth in part in the description which follows and, in part, will be apparent from the description, or may be learned by practice of the presented embodiments of the disclosure.

In accordance with an aspect of the disclosure, a display apparatus may include may include a display; a wireless communication module configured to wirelessly communicate in a first frequency band or a second frequency band; and a controller configured to control the wireless communication module to search for a radio signal transmitted from a wireless access point (WAP), to control the display to display identification information included in each of a plurality of radio signals received by the wireless communication module, and to display a message for guiding wireless communication with the WAP in the first frequency band on the display based on the user's selection of wireless communication with the WAP in the second frequency band.

In accordance with an aspect of the disclosure, in a method of controlling a display apparatus wirelessly communicating in a first frequency band or a second frequency band. The method of controlling the display apparatus may include searching, by a controller, for a radio signal transmitted from a wireless access point (WAP); displaying, by the controller, identification information included in each of a plurality of radio signals received by a wireless communication module; and displaying, by the controller, a message for guiding wireless communication with the WAP in the first frequency band based on the user's selection of wireless communication with the WAP in the second frequency band.

In accordance with an aspect of the disclosure, a display apparatus may include may include a display; a wireless communication module configured to wirelessly communicate in a first frequency band or a second frequency band; and a controller configured to control the wireless communication module to search for a radio signal transmitted from a wireless access point (WAP), to control the display to display identification information included in each of a plurality of radio signals received by the wireless communication module, to control the wireless communication module to wirelessly communicate with the WAP in the second frequency band in response to a user input, to determine whether the WAP provides wireless communication in the first frequency band and wireless communication in the second frequency band based on identification information included in each of the plurality of wireless signals, in response to a deterioration in video quality or a deterioration in communication quality during wireless communication with the WAP in the second frequency band, and to display a message for guiding wireless communication with the WAP in the first frequency band on the display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
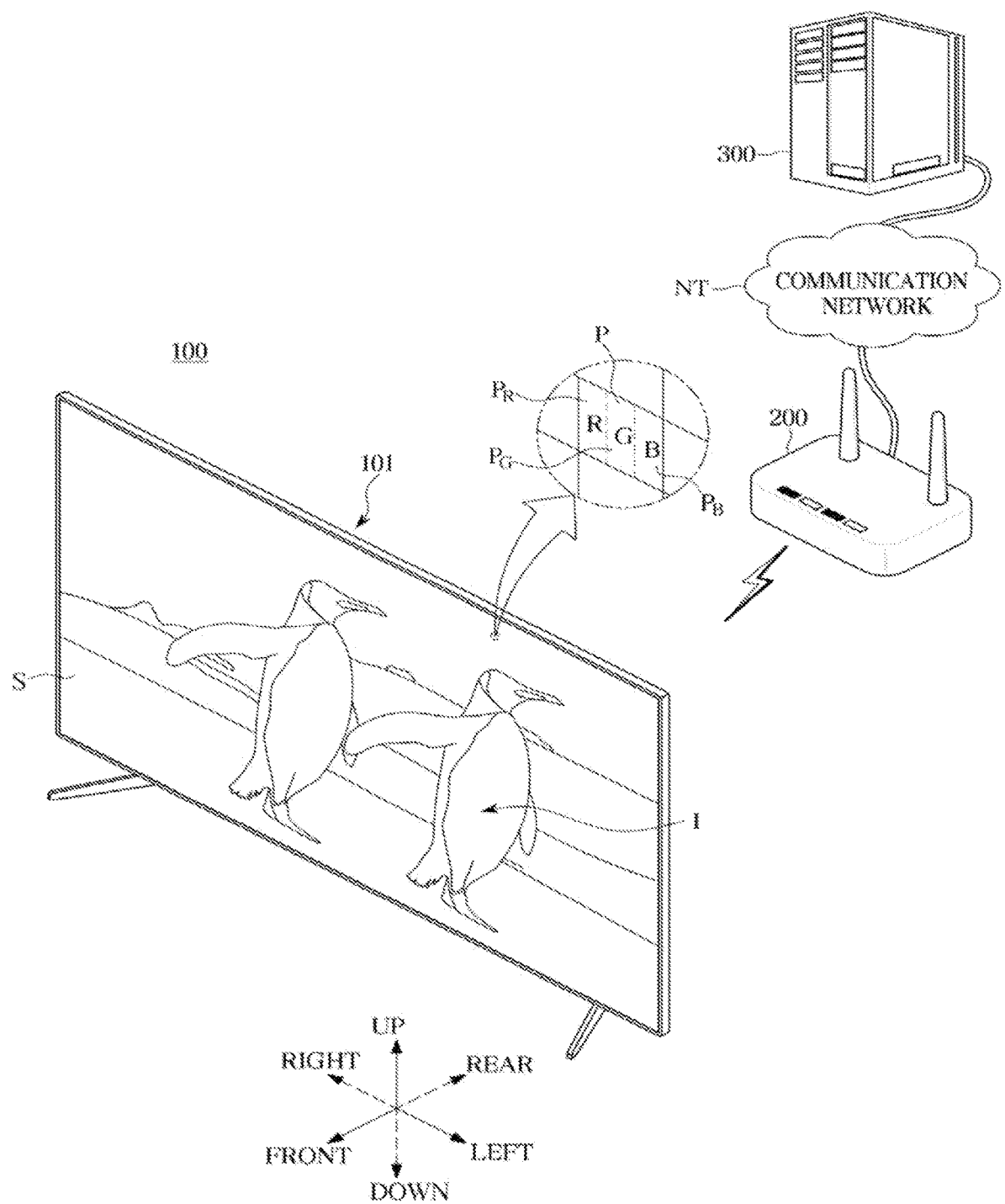
FIG. 1 is a view illustrating a display apparatus, a WAP, and a service apparatus according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, an operation principle and embodiments of the disclosure will be described with reference to accompanying drawings.

FIG. 1 is a view illustrating a display apparatus, a WAP, and a service apparatus according to an embodiment.

Referring to FIG. 1, a display apparatus 100 may be wirelessly and/or wired to a service server 300 through a communication network NT including a wireless access point (WAP) 200.

The display apparatus 100 may be, for example, an apparatus capable of processing an image signal received from the outside (e.g., external image source) and/or image data stored therein, and visually displaying the processed image. As illustrated in FIG. 1, the display apparatus 100 may be implemented as a TV, but the embodiment of the display apparatus 100 is not limited thereto. For example, the display apparatus 100 may be implemented as a monitor of a computer, or may be included in a navigation terminal device or various portable terminal devices. The portable terminal devices may include, for example, and without limitation, a desktop computer, a laptop computer, a smartphone, a tablet personal computer (PC), a wearable computing device, a personal digital assistant (PDA), or the like.

In addition, the display apparatus 100 may be a large format display (LFD) installed outdoors such as on a building roof or at a bus stop. The outdoors is not necessarily limited to the outside, but should be understood as a concept including a place where a large number of people can go in and out, even an area such as a subway station, a shopping mall, a movie theater, a company, a store, etc.

The display apparatus 100 may receive video data and audio data from various content sources including the service server 300, and may output video (continuation of a plurality of images) and audio corresponding to the video data and the audio data. For example, the display apparatus 100 may receive the video data and the audio data (television broadcast content) through a broadcast receiving antenna or a cable, receive the video data and the audio data from a content reproduction device, or receive the video data and the audio data from a content providing server of a content provider. In addition, the display apparatus 100 may restore the plurality of images included in the video data and continuously display the plurality of images.

As illustrated in FIG. 1, the display apparatus 100 may include a main body 101 accommodating a plurality of components for displaying an image I and a screen S provided on one surface of the main body 101 to display the image I.

The main body 101 may form an appearance of the display apparatus 100 and the component for displaying the image I by the display apparatus 100 may be provided in the inside of the main body 101. The main body 101 illustrated in FIG. 1 may be in the form of a flat plate, but the shape of the main body 101 is not limited to that illustrated in FIG. 1. For example, the main body 101 may have a shape in which left and right ends protrude forward and a center part is curved so as to be concave.

The screen S may be formed on the front surface of the main body 101, and the screen S may display the image I as visual information.

A plurality of pixels P may be formed on the screen S, and the image I displayed on the screen S may be formed by a combination of light emitted from the plurality of pixels P. For example, the single image I may be formed on the screen S by combining the light emitted by the plurality of pixels P with a mosaic.

Each of the plurality of pixels P may emit the light of various brightness and various colors.

Each of the plurality of pixels P may include a configuration (for example, an organic light emitting diode) capable of emitting the light directly in order to emit the light of various brightness, or a configuration (for example, a liquid crystal panel) capable of transmitting or blocking the light emitted by a backlight unit or the like.

In order to emit the light of various colors, each of the plurality of pixels P may include subpixels $P_{sub1}$, $P_{sub2}$, and $P_{sub3}$. For example, the subpixels may include a red subpixel capable of emitting red light, a green subpixel capable of emitting green light, and a blue subpixel capable of emitting blue light (RGB pixels). As another example, the subpixels may include the red subpixel, the green subpixel, the blue subpixel, and a white subpixel capable of emitting white light (RGBW pixels). As another example, the subpixels may include the red subpixel, the green subpixel, the blue subpixel, and a yellow subpixel capable of emitting yellow light (RGBY pixels).

However, the subpixel structure is not limited to what has been described above, and may include various subpixel structures to be disclosed now or later.

The display apparatus 100 may include various types of display panels for displaying the image. For example, the display apparatus 100 may include, for example, and without limitation, a liquid crystal display (LCD) panel, a light emitting diode (LED) panel, an organic light emitting diode (OLED) panel, a quantum dot display panel, or the like.

The communication network NT may include both wired and wireless communication networks. The wired network may include a cable network or a telephone network or an Internet using Ethernet, the IEEE 802.3 technology standard. The wireless network may include the wireless network using WiFi™, the IEEE 802.11 technology standard, Bluetooth™, the IEEE 802.15.1 technology standard, and ZigBee™, the IEEE 802.15.4 technology standard. Further, the wireless network may include mobile communication service networks such as code divisional multiple access (CDMA), wideband code division multiple access (WCDMA), Global Systems for Mobile communications (GSM), Long Term Evolution (LTE), and WiBro. Of course, the communication network NT is not limited thereto, and may include a communication network of a communication service to be implemented in the future.

For example, the communication network NT may include the WAP 200, and the display apparatus 100 may access the WAP 200 using the wireless communication standard such as WiFi™, and the WAP 200 may be connected to the Internet through the wired network provided by an Internet service provider. Here, the WAP 200 may include a hub, a router, a switch, a gateway, etc., and may be replaced by the hub, the router, the switch, the gateway, etc.

The service server 300 may store video/audio content. For example, the service server 300 may store various video contents such as movies, sports, and the like.

The service server 300 may transmit video (consecutive image frames) and audio included in video content to the display apparatus 100 through a network of an Internet service provider. At this time, since a network bandwidth of the Internet service provider is limited, the service server 300 may compress and encode video and audio (hereinafter, compression and encoding are collectively referred to as 'encoding'), and may transmit encoded video data and audio data to the display apparatus 100.

The service server 300 may encode the video data and the audio data in a 'stream' form (hereinafter referred to as a 'data stream') in order to transmit video content in real time. The 'encoding' may include compressing the video content to reduce the capacity of transmitted video content, and may use standards such as moving picture experts group (MPEG) and high efficiency video coding (HEVC). The 'data stream' may be a sequence of temporally continuous data (or bits). The continuous data stream contains the video data and the audio data, and the video data and the audio data may be restored from the continuous data stream. The display apparatus 100 may receive the data stream from the service server 300, decompress and decode the data stream (hereinafter, compression and encoding are collectively referred to as 'decoding'), and output decoded video data and audio data.

As such, the service server 300 may transmit video content having a low resolution or transmit video content having a low frame rate in response to a decrease in network bandwidth. In response to this, the display apparatus 100 may output the video content having the low resolution or output the video content having the low frame rate.

Hereinafter, the configuration and operation of the display apparatus 100 will be described.

Figure 2:
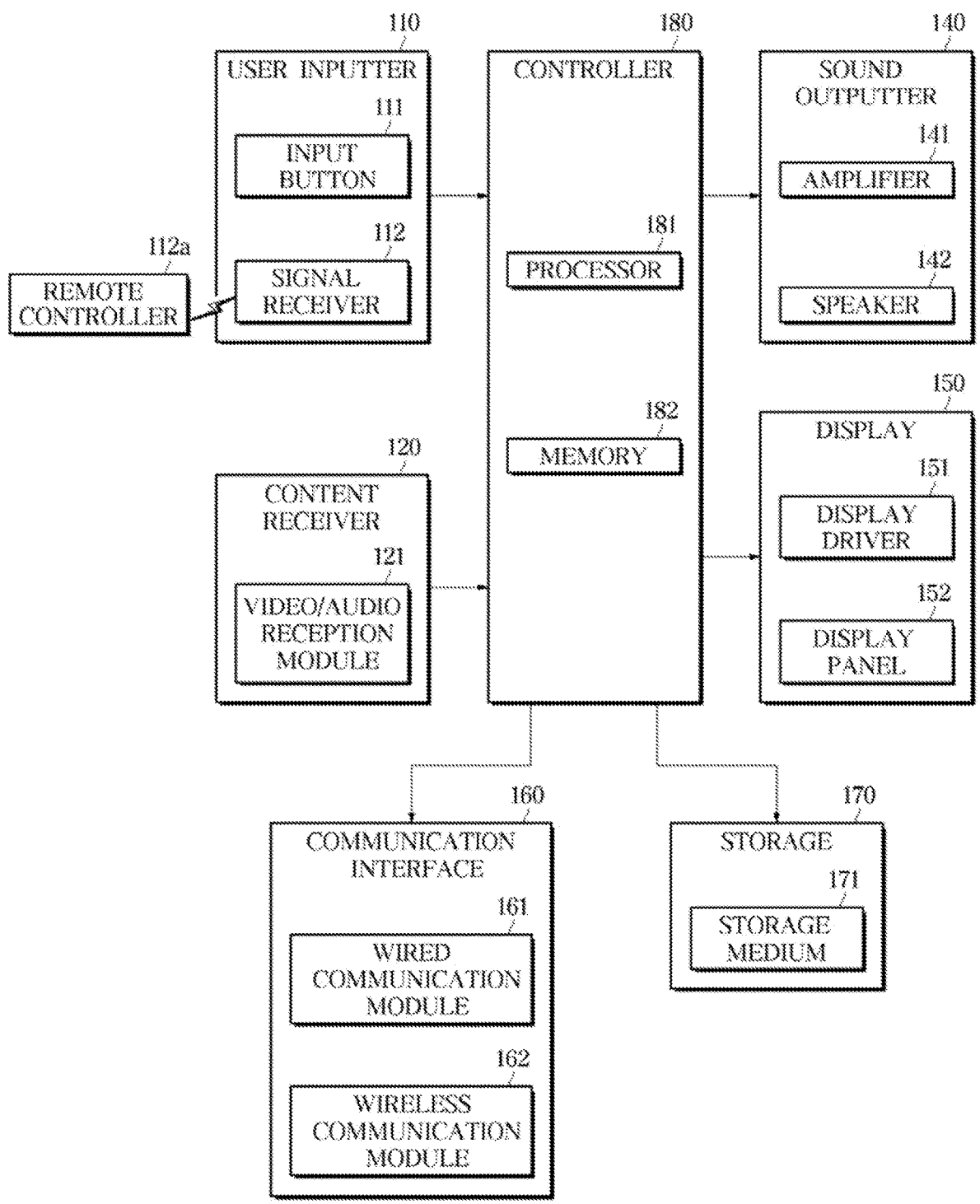
FIG. 2 is a view illustrating a configuration of a display apparatus according to an embodiment.
Figure 3:
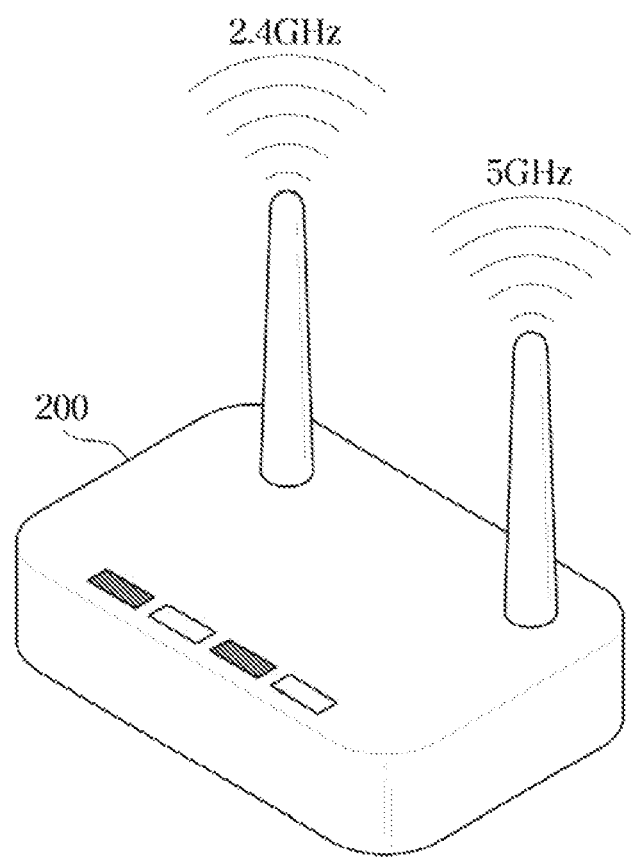
FIG. 3 is a view illustrating wireless communication in a 2.4 GHz band and wireless communication in a 5 GHz band provided by a WAP.
Figure 4:
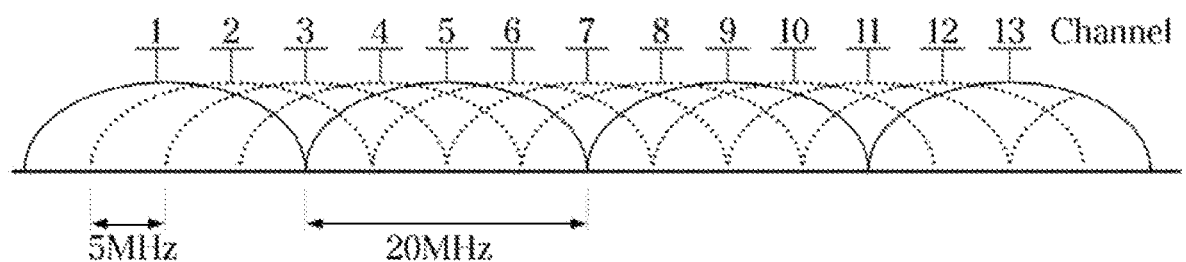
FIG. 4 is a view illustrating channels in a 2.4 GHz band provided by Wi-Fi communication.
Figure 5:
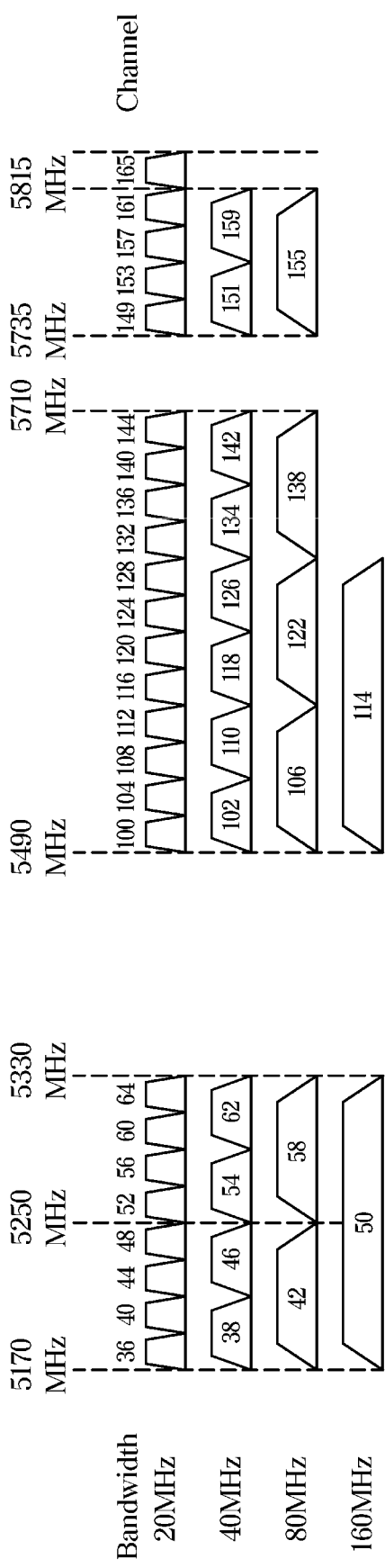
FIG. 5 is a view illustrating channels in a 5 GHz band provided by Wi-Fi communication.

FIG. 2 is a view illustrating a configuration of a display apparatus according to an embodiment, FIG. 3 is a view illustrating wireless communication in a 2.4 GHz band and wireless communication in a 5 GHz band provided by a WAP, FIG. 4 is a view illustrating channels in a 2.4 GHz band provided by Wi-Fi communication, and FIG. 5 is a view illustrating channels in a 5 GHz band provided by Wi-Fi communication.

Referring to FIGS. 2 to 5, the display apparatus 100 may include a user inputter (e.g., including input circuitry) 110 for receiving a user input from the user, a content receiver (e.g., including receiving circuitry) 120 for receiving video and/or audio signals from content sources, a sound outputter (e.g., including sound output circuitry) 140 for outputting sound, a display 150 for displaying images, a communication interface 160 to communicate with external devices, a storage 170 for storing programs and data for controlling an operation of the display apparatus 100, and a controller 180 for processing the video signals and/or the audio signals received by the content receiver 120 and controlling the operation of the display apparatus 100.

The user inputter 110 may include various input circuitry including, for example, and without limitation, input buttons 111 for receiving the user input. For example, the user inputter 110 may include a power button for turning on or off the display apparatus 100, a sound control button for adjusting the volume of the sound output by the display apparatus 100, a source selection button for selecting the content source, and the like.

The input buttons 111 may each receive the user input and output an electrical signal corresponding to the user input to the controller 180. The input buttons 111 may be implemented by various input devices, such as, for example, and without limitation, a push switch, a touch switch, a dial, a slide switch, a toggle switch, and the like.

The user inputter 110 may also include a signal receiver 112 including various receiving circuitry for receiving a remote control signal of a remote controller 112a. The remote controller 112a for receiving the user input may be provided separately from the display apparatus 100, and may receive the user input and transmit a radio signal (e.g., infrared signal) corresponding to the user input to the display apparatus 100. The signal receiver 112 may receive the radio signal from the remote controller 112a and output an electrical signal (voltage or current) corresponding to the user input to the controller 180.

The content receiver 120 may include a video/audio reception module 121 that receives the data stream including the video data and/or the audio data from content sources. For example, the video/audio reception module 121 may include a video receiving device coupled to a graphics processor, an image processor, etc., and an audio receiving device coupled to an audio processor, etc.

The video/audio reception module 121 may receive the data stream from content sources. For example, the video/audio reception module 121 may include a content reception terminal such as a component (YPbPr/RGB) terminal, a composite video blanking and sync (CVBS) terminal, an audio terminal, a High Definition Multimedia Interface (HDMI) terminal, a Universal Serial Bus (USB) terminal, and the like.

Optionally, the content receiver 120 may further include a tuner. The tuner may receive a broadcast signal from a broadcast reception antenna or a wired cable, and extract a broadcast signal of a channel selected by the user from among the broadcast signals. For example, the tuner may pass a broadcast signal having a frequency corresponding to a channel selected by the user among a plurality of broadcast signals received through the broadcast reception antenna or the wired cable, and block a broadcast signal having a different frequency.

As such, the content receiver 120 may receive the video data and the audio data from content sources through the video/audio reception module 121, and the data stream received through the video/audio reception module 121 may be output to the controller 180.

The sound outputter 140 may include various sound output circuitry, including, for example, the sound amplifier 141 for amplifying sound, and a speaker 142 for audibly outputting the amplified sound.

The speaker 142 may convert the analog sound signal amplified by the sound amplifier 141 into an audible sound (sound wave). For example, the speaker 142 may include a thin film that vibrates according to an electrical sound signal, and sound waves may be generated by the vibration of the thin film.

The display 150 may include a display panel 152 for visually displaying the image and a display driver 151 for driving the display panel 152.

As described above, the display apparatus 100 may restore the plurality of images included in the video data, and may continuously display the plurality of images.

The display driver 151 may obtain the plurality of images and transmit a signal (driving signal) for displaying each of the plurality of images on the display panel 152 to the display panel 152.

The display driver 151 may transmit the driving signal to each of the plurality of pixels included in the display panel 152. Each of the plurality of pixels may emit light depending on the received driving signal, and the emitted lights may be combined to form a single image.

The display panel 152 may emit light and display the image according to the driving signal received from the display driver 151.

The display panel 152 may include pixels serving as a unit for displaying the image. Each of the pixels may receive an electrical signal representative of the image from the display driver 151 and output an optical signal corresponding to the received electrical signal. As described above, the optical signals output by the plurality of pixels P may be combined and displayed on the display panel 152.

The display apparatus 100 may include various types of the display panel 152 for displaying images. For example, the display apparatus 100 may include an emissive display panel that displays the image using a device that emits light by itself. The OLED panel or the quantum dot display panel is representative emissive display panel. As another example, the display apparatus 100 may include a non-emissive display panel that displays the image by passing or blocking light emitted from a light source (backlight unit). The LCD panel is a typical non-emissive display panel.

The communication interface 160 may receive the video data and the audio data (e.g., video/audio files) from the content source as it is, or may receive the data stream including the video data and the audio data. Hereinafter, an example in which the communication interface 160 receives the data stream is described, but is not limited thereto.

The communication interface 160 may include a wired communication module 161 for receiving the data stream from the content source by wire and a wireless communication module 162 for wirelessly receiving the data stream from the content source.

The wired communication module 161 may receive the data stream from the content source using various communication standards. For example, the wired communication module 161 may receive the data stream from the content source using Ethernet (IEEE 802.3 technology standard).

The wired communication module 161 may include a communication circuit (e.g., network interface controller) including a processor and/or memory for modulating/demodulating data for wired communication.

The wireless communication module 162 may exchange radio signals with the WAP 200 using various wireless communication standards. In addition, the wireless communication module 162 may receive the data stream from the content source through the WAP 200.

For example, the wireless communication module 162, using a wireless communication standard such as Wi-Fi (WiFi™, IEEE 802.11 technology standard) or Bluetooth (Bluetooth™, IEEE 802.15.1 technology standard) or Zig-Bee™ (IEEE 802.15.4 technology standard), may connect to the WAP 200 and receive the data stream received from the content source through the WAP 200.

The wireless communication module 162 may include an antenna for transmitting and receiving the radio signal and a communication circuit (e.g., a wireless network interface controller) including a processor and/or memory for decoding/encoding data for wireless communication.

Hereinafter, the wireless communication module 162 exemplifies a case of exchanging data with the WAP 200 using a Wi-Fi technology standard, but is not limited thereto. As described above, the wireless communication module 162 may communicate using Bluetooth, ZigBee, or various other wireless communication standards.

The wireless communication module 162 may exchange data with the WAP 200 using the Wi-Fi communication standard. Furthermore, the wireless communication module 162 may ultimately exchange data with the service server 300 through the WAP 200.

As illustrated in FIG. 3, the wireless communication module 162 may communicate with the WAP 200 through wireless communication in the 2.4 GHz band, or may communicate with the WAP 200 through wireless communication in the 5 GHz band.

The WAP 200 may periodically transmit a beacon frame so that other devices including the display apparatus 100 can access the WAP 200. The beacon frame may include identification information for identifying the WAP 200, that is, a service set identifier (SSID) and a basic service set identifier (BSS ID).

The SSID may be used to identify group 1 WAPs. For example, the WAPs operating under the jurisdiction of one IP subnet may have the same SSID. In general, the SSID may be composed of letters or numbers or symbols that the user can recognize.

The BSS ID may be used to identify each of the WAPs. For example, the BSS ID may be used to identify the plurality of WAPs having the same SSID. The BSS ID may be the same as, for example, a media access control (MAC) address.

The display apparatus 100 may receive the beacon frame of the WAP 200 through the wireless communication module 162, and may identify the WAP 200 based on the SSID and/or BSS ID included in the beacon frame. The display apparatus 100 may transmit a probe request frame for requesting connection to the identified WAP 200, and the WAP 200 may transmit a probe response frame to the display apparatus 100 in response to receiving the probe request frame.

The display apparatus 100 may attempt authentication through a pre-set authentication code (e.g., password). The display apparatus 100 may transmit an authentication request for authentication to the WAP 200, and the WAP 200 may perform authentication in response to the authentication request and transmit an authentication response to the display apparatus 100. When the display apparatus 100 is authenticated by the authentication code, the WAP 200 may establish a connection between the WAP 200 and the display apparatus 100 according to the Wi-Fi communication standard.

The WAP 200 may provide wireless communication using a frequency of the 2.4 GHz band and wireless communication using a frequency of the 5 GHz band. Particularly, the WAP 200 may provide wireless communication using a frequency band from 2.412 GHz to 2.484 GHz and wireless communication using a frequency band from 5.15 GHz to 5.725 GHz.

The WAP 200 may provide only wireless communication in the 2.4 GHz band, or both wireless communication in the 2.4 GHz band and wireless communication in the 5 GHz band. A WAP that provides only wireless communication in the 2.4 GHz band is referred to the WAP that provides a single band. Providing both wireless communication in the 2.4 GHz band and wireless communication in the 5 GHz band is referred to as the WAP that provides a dual band or a multi band.

The WAP 200 may provide 13 wireless communication channels having a bandwidth of 22 MHz in the 2.4 GHz band as illustrated in FIG. 4 (a number of channels in the 2.4 GHz band may vary from country to country). For example, in Korea and Europe, the Wi-Fi communication standard provides 13 channels, the Wi-Fi communication standard in Japan provides 14 channels, and the Wi-Fi communication standard in US provides 11 channels.

The display apparatus 100 may exchange data with the WAP 200 through any one of 13 channels in the 2.4 GHz band. In general, a channel for wireless communication is set by the WAP 200, and the display apparatus 100 may exchange data with the WAP 200 through a channel set by the WAP 200.

Each of the 13 channels provides approximately 22 MHz of bandwidth. However, there is a difference of approximately 20 MHz between a center frequency (2,412 Hz) of a first channel #1 and a center frequency (2.432 GHz) of a fifth channel #5. There is only a difference of approximately 5 MHz between the center frequency of the first channel #1 (2,412 Hz) and the center frequency of the second channel #2 (2.417 GHz). Therefore, practically, Wi-Fi wireless communication in the 2.4 GHz band only provides a stable channel of four channels.

Accordingly, when the number of devices using the 2.4 GHz band exceeds four, interference between channels may rapidly increase. In addition, when the number of devices using the 2.4 GHz band exceeds four, the quality of wireless communication in the 2.4 GHz band may be rapidly deteriorated. Wireless communication quality may be determined based on key performance indicators such as received signal strength, signal-to-noise ratio, transmission rate, retry rate, and throughput.

The WAP 200 provides a plurality of channels in the 5 GHz band, as illustrated in FIG. 5. For example, Wi-Fi wireless communication in the 5 GHz band may provide 25 channels with a bandwidth of 201 MH. Also, the difference in the center frequency between channels with adjacent frequencies is approximately 20 GHz. Accordingly, interference between 25 channels may be minimized, and 25 devices may use wireless communication in the 5 GHz band in a short distance.

In addition, the Wi-Fi wireless communication in the 5 GHz band may provide 12 channels with a bandwidth of 40 MHz, 6 channels with a bandwidth of 80 MHz, and two channels with a bandwidth of 160 MHz.

As such, the Wi-Fi wireless communication in the 5 GHz band provides a greater number of communication channels than the Wi-Fi wireless communication in the 2.4 GHz band. The communication capacity that the 5 GHz band Wi-Fi wireless communication can provide is greater than the communication capacity that the 2.4 GHz band Wi-Fi wireless communication can provide. In addition, communication interference between devices using the Wi-Fi wireless communication in the 5 GHz band is less than that between devices using the Wi-Fi wireless communication in the 2.4 GHz band.

The storage 170 may include a storage medium 171 for storing programs and data for controlling the operation of the display apparatus 100. In addition, the storage 170 may include a management circuit including a processor and/or memory for managing data stored in the storage medium 171.

For example, the storage medium 171 may store an operating system (OS) that manages resources (e.g., software and/or hardware of the display apparatus) included in the display apparatus 100, a video player that decodes the video data/audio data and restores the image, a management application, etc. for managing the display apparatus 100.

The storage medium 171 may store the video data/audio data displayed by the display apparatus 100. For example, the storage medium 171 may store an image file in which the video data/audio data is compressed/encoded.

The storage medium 171 may include a non-volatile memory to preserve stored programs and data even when the power is cut off. For example, the storage medium 171 may include flash memory, a solid state drive (SSD), a hard disc drive, or an optical disc drive.

The controller 180 may include a processor 181 for processing the data stream (or video data/audio data) and the user's touch input, and a memory 182 for storing the data stream and processing data such as the user's touch input.

The memory 182 may store programs and data for processing the data stream, and temporarily store temporary data generated while processing the data stream.

The memory 182 may store programs and data for controlling the display apparatus 100, and temporarily store temporary data generated while controlling the display apparatus 100.

The memory 182 includes a non-volatile memory such as read only memory (ROM) and flash memory for storing data for a long period of time, and a volatile memory such as static random access memory (S-RAM) and dynamic random access memory (D-RAM) for temporarily storing data.

The memory 182 may include one memory chip including a plurality of memory cores, or may include a plurality of memory chips.

The processor 181 may decode the data stream received through the communication interface 160 and output the video data (continuous image data) and the audio data decoded from the data stream. The video data may be displayed as the image through the display panel 152. The audio data may be output as sound through the speaker 142.

The processor 181 may identify the WAP 200 based on the identification information of the WAP 200, and also determine whether the WAP 200 provides wireless communication of a single band or wireless communication of the multi band. Depending on whether the WAP 200 provides wireless communication in the single band or wireless communication in the multi band, the processor 181 may recommend the wireless communication in a band with excellent communication quality (for example, wireless communication in the 5 GHz band) to the user.

The processor 181, based on the data received from the WAP 200, may identify a decrease in the quality of communication with the WAP 200 (for example, a data reception rate decrease, a re-reception rate increase, a reception data amount decrease, etc.), or may identify in quality of the video received from the WAP 200 (e.g., the decrease in the frame rate of the video, the decrease in the resolution of the image included in the video, etc.). The processor 181 may change the communication band to a communication band having excellent communication quality (e.g., from the 2.4 GHz band to the 5 GHz band) in response to the decrease in communication quality or the decrease in video quality.

The processor 181 may include one processor chip including a plurality of cores, or may include a plurality of processor chips. For example, the processor 181 may include an image processor for processing an image, a micro controller for processing the user's touch input, and controlling the operation of the display apparatus 100.

In addition, the processor 181 may be provided separately from the memory 182 or may be provided integrally with the memory 182.

As such, the controller 180 including the processor 181 and the memory 182 may process the data stream, and display the restored image from the data stream on the display panel 152 of the display 150.

The controller 180 may include hardware such as the processor 181 and the memory 182, and may also include software such as the OS and the video player.

The controller 180 may include various components that perform various functions by combining hardware and software.

Figure 6:
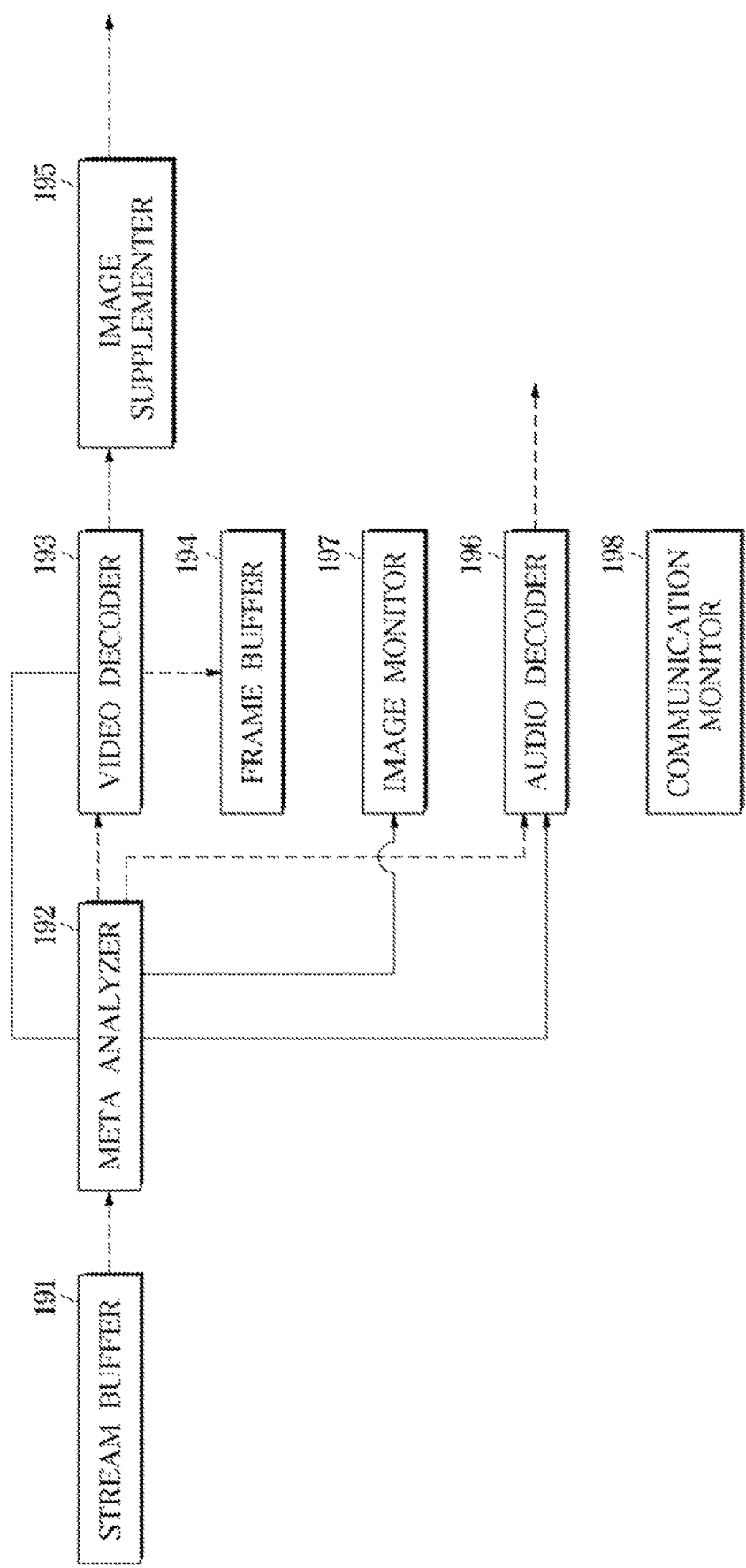
FIG. 6 is a view illustrating a configuration of a controller included in a display apparatus according to an embodiment.

FIG. 6 is a view illustrating a configuration of a controller included in a display apparatus according to an embodiment.

Referring to FIG. 6, the controller 180 may include a stream buffer 191 for temporarily storing the data stream, a meta analyzer 192 for analyzing metadata of the data stream, a video decoder 193 for decoding the data stream into a series (video) of the plurality of image frames, a frame buffer 194 for temporarily storing the image frame, an image supplementer 195 for complementing the image frame, an audio decoder 196 for decoding the data stream into the audio data, an image monitor 197 for identifying a quality deterioration of the streaming video, and a communication monitor 198 for identifying a quality deterioration of the wireless communication.

The stream buffer 191 may temporarily store the data stream received by the communication interface 160 until decoding. The stream buffer 191 may be implemented as the memory 182 of the controller 180.

The meta analyzer 192 may extract the metadata from the data stream received by the communication interface 160 and determine a decoding option based on the metadata of the data stream. The metadata may include information about the content itself included in the data stream, information about the video of the content, and information about the audio of the content. For example, the metadata may include a title of the content, a type of the content, a genre of the content, a creator of the content, and the like. The metadata may include an encoding codec of the video, the resolution of the video, a frame rate of the video, and the like.

The video decoder 193 may decode the data stream and restore the plurality of image frames. Particularly, the video decoder 193 may set the video decoding option based on the metadata, decode the data stream according to the set video decoding option, and restore the plurality of image frames. For example, the video decoder 193 may decode the data stream into the plurality of image frames using a digital image compression algorithm such as moving picture experts group (MPEG)-2, MPEG4-4, and high efficiency video coding (HEVC).

The frame buffer 194 may store the plurality of image frames decoded by the video decoder 193. For example, the frame buffer 194 may store 'current image frames (currently output image frames)', 'past image frames (image frames already output)', and 'future image frames (image frames that have been decoded and not output)' based on the image frame output from an image processor. The frame buffer 194 may be implemented as the memory 182 of the controller 180.

The image supplementer 195 may determine a resolution reduction of the image or a frame rate reduction of the video based on the metadata about the resolution of the video and/or the frame rate of the video.

The image supplementer 195 may complement the image frame with a reduced image resolution or a reduced frame rate. For example, when the video with the reduced image resolution is received from the service server 300, the image supplementer 195 may complement the resolution of the image frame. When the video with the reduced frame rate is received from the service server 300, the image supplementer 195 may complement the frame rate of the video.

The audio decoder 196 may decode the data stream and restore the audio data. Particularly, the audio decoder 196 may set the audio decoding option based on metadata, decode the data stream and restore the sound according to the set audio decoding option. For example, the audio decoder 196 may decode the data stream into the audio data using a digital sound compression algorithm such as advanced audio coding (AAC) and high-efficiency advanced audio coding (HE-AAC).

The communication monitor 198 may identify the decrease in wireless communication quality based on key performance indicators such as received signal strength, data rate, retry rate, and throughput.

Received signal strength indicator (RSSI) may indicate the strength of the radio signal received by the wireless communication module 162. The RSSI is expressed in units of "dBm" and the power in mW is expressed in dB scale. For example, 0 dBm may represent 1 mW, −10 dBm may represent 0.1 mW, −20 dBm may represent 0.01 mW, and −30 dBm may represent 0.001 mW. The communication monitor 198 may identify the deterioration in wireless communication quality depending on whether the RSSI becomes less than or equal to a predetermined value.

The data rate may represent the number of data elements received per unit time by the wireless communication module 161. "Bps" representing the number of bits per second or "B/s" representing the number of bytes per second are used as a unit of the data rate. The communication monitor 198 may identify the deterioration in wireless communication quality depending on whether the data rate becomes less than or equal to a predetermined value.

The retry rate may represent the number or rate at which the wireless communication module 162 requests data transmission. The wireless communication module 162 may retransmit the specified number of requests when it does not receive data from the WAP 200. The communication monitor 198 may identify the deterioration in wireless communication quality depending on whether the retry rate becomes more than a predetermined value.

Similar to the data rate, the throughput may represent the number of data elements processed per unit time by the wireless communication module 162. The communication monitor 198 may identify the degradation in wireless communication quality depending on whether the throughput becomes less than or equal to a predetermined value.

The image monitor 197 may identify the degradation of video quality based on the key performance indicators such as the frame rate of the video received by the wireless communication module 162 or the resolution of the image included in the video.

The frame rate of the video may represent the number of image frames per unit time constituting the video. As the frame rate of the video decreases, the amount of data transmitted per unit time may decrease when the video is transmitted. Accordingly, when the communication quality with the display apparatus 100 is deteriorated, the service server 300 may reduce the frame rate of the transmitted video so that the video can be seamlessly reproduced.

The video resolution may represent the number of pixels of the image frame constituting the video. As the video resolution decreases, the size (or capacity) of the video may decrease. When the video is transmitted, the amount of data transmitted per unit time may decrease. Accordingly, when the quality of communication with the display apparatus 100 is deteriorated, the service server 300 may reduce the resolution of the transmitted video so that the video can be seamlessly reproduced.

The image monitor 197 may obtain the image resolution of the video and the frame rate of the video among the metadata extracted by the meta analyzer 192, and may identify the deterioration in video quality based on the image resolution of the video and the frame rate of the video extracted by the meta analyzer 192.

As described above, the controller 180 may identify the deterioration in wireless communication quality or the deterioration in video quality, and guide the user of the change of the band for wireless communication in response to the deterioration in wireless communication quality or the deterioration in video quality.

Hereinafter, the operation of the display apparatus 100 will be described.

Figure 7:
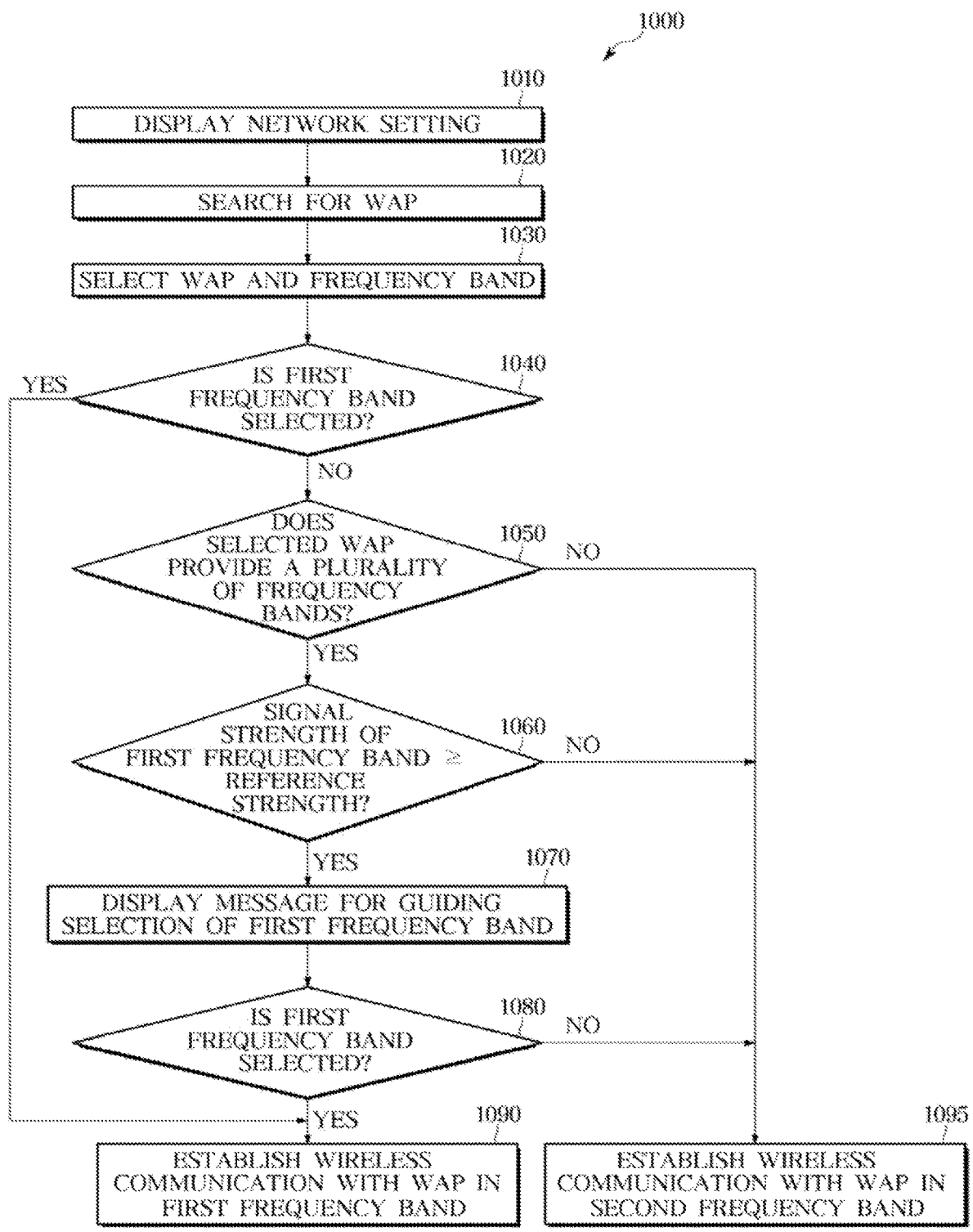
FIG. 7 is a view illustrating a method of recommending a frequency band for wireless communication by a display apparatus according to an embodiment.
Figure 8:
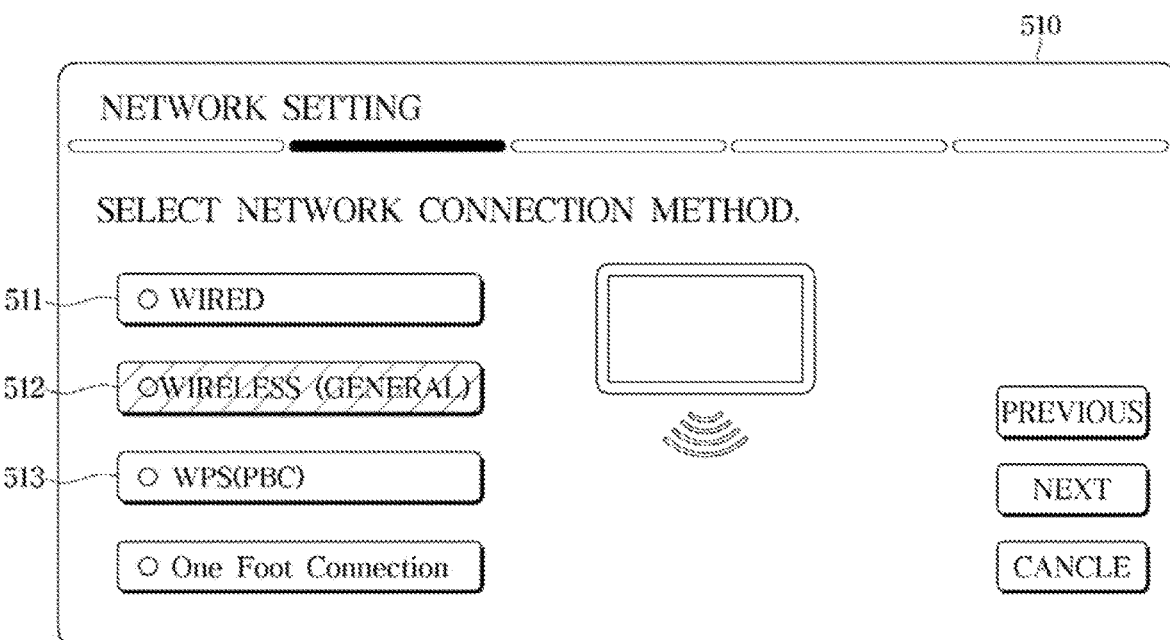
FIG. 8 is a view illustrating a network setting menu for setting a network setting value by a display apparatus according to an embodiment.
Figure 9:
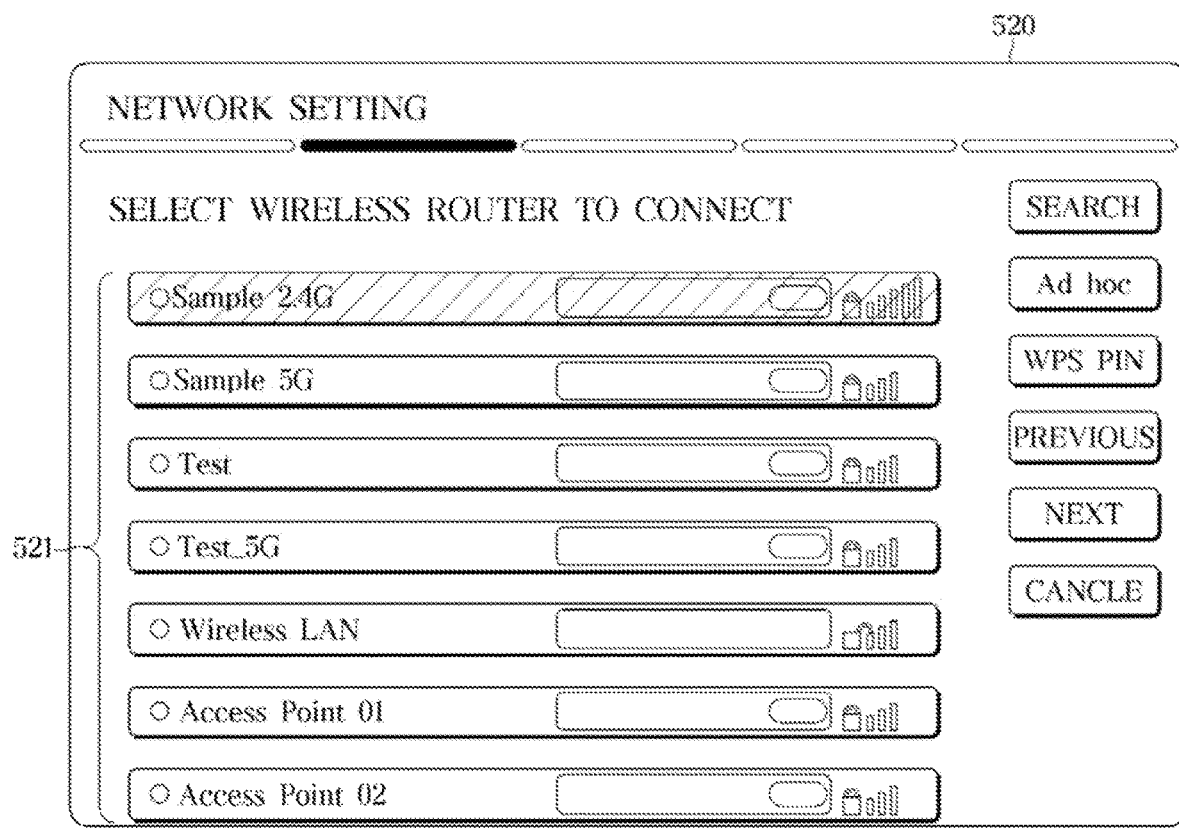
FIG. 9 is a view illustrating a menu in which a display apparatus displays identification information of a WAP according to an embodiment.
Figure 10:
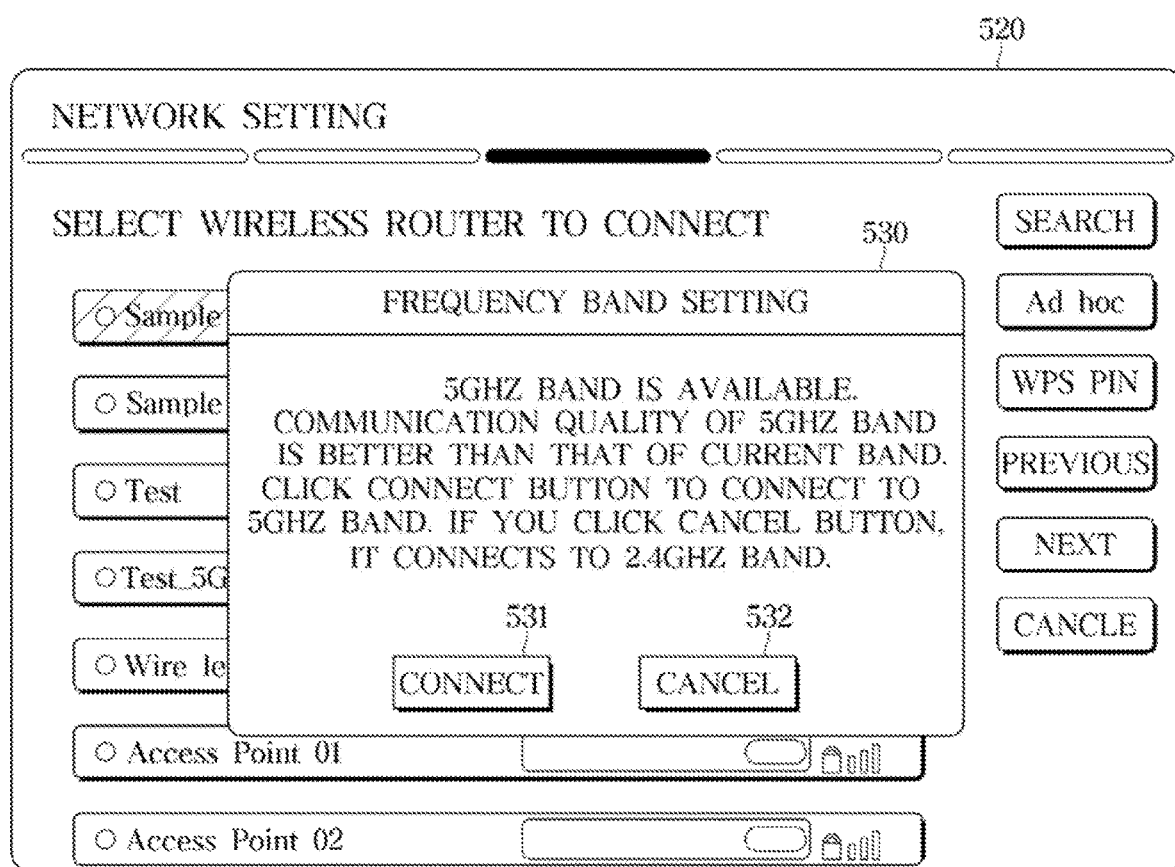
FIG. 10 is a view illustrating a pop-up window for recommending a frequency band for wireless communication by a display apparatus according to an embodiment.

FIG. 7 is a view illustrating a method of recommending a frequency band for wireless communication by a display apparatus according to an embodiment, FIG. 8 is a view illustrating a network setting menu for setting a network setting value by a display apparatus according to an embodiment, FIG. 9 is a view illustrating a menu in which a display apparatus displays identification information of a WAP according to an embodiment, and FIG. 10 is a view illustrating a pop-up window for recommending a frequency band for wireless communication by a display apparatus according to an embodiment.

Referring to FIGS. 7 to 10, a method 1000 of recommending the band of the display apparatus 100 will be described.

The display apparatus 100 may display a network setting menu 510 (1010).

The user may input a user input for setting network-related setting values using the remote controller 112a or the like. The controller 180 of the display apparatus 100 may control the display 150 to display the network setting menu 510 for setting the network-related setting values in response to the user input.

For example, the controller 180 may control the display 150 to display the network setting menu 510 as illustrated in FIG. 8. The network setting menu 510 may include a wired communication setting 511 for inputting a setting value for wired communication, a wireless communication setting 512 for inputting a setting value for wireless communication, and an authentication code setting 513 for inputting an authentication code for wireless communication.

The user may select the wireless communication setting 512 from the network setting menu 510 displayed on the display apparatus 100 using the remote controller 112a or the like.

The display apparatus 100 may search for the WAP 200 (1020).

The controller 180 may receive beacon frames transmitted from WAPs through the communication interface 160. The controller 180 may obtain the identification information (e.g., service set identifier) of WAPs from beacon frames received from WAPs.

The WAP 200 may periodically transmit the beacon frame. The beacon frame may include identification information (e.g., SSID and/or BSS ID) for identifying the WAP 200.

The WAP 200 may provide wireless communication using the frequency of the 2.4 GHz band and wireless communication using the frequency of the 5 GHz band. In addition, the WAP 200 may transmit beacon frames having different identification information (e.g., different service set identifiers) in the 2.4 GHz band and the 5 GHz band. For example, the WAP 200 may transmit the beacon frame of the 2.4 GHz band and the beacon frame of the 5 GHz band, respectively. The SSID representing the 2.4 GHz band may be different from different SSIDs representing the 5 GHz band. In addition, the MAC address of the 2.4 GHz band may be different from the MAC address of the 5 GHz band.

In order to receive the beacon frames of WAPs, the wireless communication module 162 may scan the plurality of bands and the plurality of frequency channels (e.g., 13 channels of the 2.4 GHz band and 25 channels of the 5 GHz band) every predetermined period. In other words, the wireless communication module 162 may search for beacon frames in the plurality of bands and the plurality of frequency channels every predetermined period.

When the beacon frame is received, the wireless communication module 162 may transmit the beacon frame to the controller 180, and the controller 180 may obtain the identification information (e.g., SSID and/or BSS ID, etc.) of WAPs from the beacon frame.

The controller 180 may store the identification information (e.g., SSID and/or BSS ID, etc.) of each of the WAPs.

The controller 180 may also control the display 150 to display the identification information (e.g., SSID and/or BSS ID, etc.) of each of the WAPs.

For example, the controller 180 may control the display 150 to display a repeater selection menu 520 as illustrated in FIG. 9. The SSID 521 of each of the plurality of WAPs may be displayed on the repeater selection menu 520.

As described above, the WAP 200 may provide the dual band or the multi band. For example, the WAP 200 may provide wireless communication only in the 2.4 GHz band, or both wireless communication in the 2.4 GHz band and the wireless communication in the 5 GHz band. In the case of providing wireless communication only in the 2.4 GHz band, the WAP 200 may transmit one SSID. The controller 180 may receive the "WirelessLAN", which is the SSID of the WAP that provides the wireless communication only in the 2.4 GHz band, through the communication interface 160 and control the display 150 to display "WirelessLAN".

In addition, in the case of providing both wireless communication in the 2.4 GHz band and wireless communication in the 5 GHz band, the WAP 200 may transmit two different SSIDs in the 2.4 GHz band and the 5 GHz band. The controller 180 may receive the SSID of the WAP that provides both wireless communication in the 2.4 GHz band and wireless communication in the 5 GHz band through the communication interface 160, and display "Sample 2.4G", "Sample 5G", "Test", "Test_5G", "AccessPoint01", and "AccessPoint02", which is SSIDs.

The display apparatus 100 may select the WAP 200 and the frequency band (1030).

The user may select any one of SSIDs of the WAP 200 displayed on the repeater selection menu 520. The user may input the user input for selecting any one of SSIDs using the remote controller 112a or the like.

The controller 180 may select the WAP 200 and the frequency band for wireless communication based on the SSID selected by the user input, and store the identification information and the frequency band of the selected WAP 200.

The display apparatus 100 may determines whether a first frequency band is selected (1040).

The first frequency band may be a frequency band having a wide bandwidth and a large number of channels among the plurality of frequency bands for wireless communication. For example, the first frequency band may be the 5 GHz band of Wi-Fi wireless communication.

For example, the controller 180 may determine whether the first frequency band (e.g., the 5 GHz band of Wi-Fi wireless communication) is selected based on the user input for selecting the SSID of the WAP 200.

As another example, the controller 180 may determine whether the first frequency band is selected based on whether the wireless communication module 162 operates in the first frequency band (e.g., 5 GHz band).

When the first frequency band is selected (YES in 1040), the display apparatus 100 may establish wireless communication with the WAP 200 in the first frequency band (1090).

When wireless communication between the WAP 200 and the first frequency band is selected, the controller 180 may control the communication interface 160 to transmit the probe request frame to the selected WAP 200. The controller 180 may display a keyboard for inputting the authentication code in response to reception of the probe response frame of the WAP 200 and may obtain the authentication code depending on the user input. The controller 180 may control the communication interface 160 to transmit the authentication code together with the authentication request. When authentication of the display apparatus 100 is completed by the authentication code, the wireless communication between the display apparatus 100 and the WAP 200 may be established.

When the first frequency band is not selected (NO in 1040), the display apparatus 100 may determine whether the selected WAP 200 provides wireless communication in the plurality of frequency bands (1050).

The controller 180 may determine whether the WAP 200 provides wireless communication of the plurality of frequency bands based on the identification information of the WAP 200.

For example, the controller 180 may determine whether the WAP 200 provides wireless communication in the plurality of frequency bands based on the SSID of the WAP 200.

The WAP 200 providing the dual band or the multi band may transmit the beacon frames having different SSIDs in the 2.4 GHz band and the 5 GHz band. In addition, SSIDs of the WAP 200 in the 2.4 GHz band and the 5 GHz band generally have similarities.

The user may set the SSID for wireless communication in the 2.4 GHz band and the SSID for wireless communication in the 5 GHz band similarly. For example, as illustrated in FIG. 9, "Sample 2.4G" and "Test" are SSIDs for wireless communication in the 2.4 GHz band, and "Sample 5G" and "Test_5G" are SSIDs for wireless communication in the 5 GHz band. In addition, the WAP transmitting "Sample 2.4G" is the same WAP as the WAP transmitting "Sample 5G", and the WAP transmitting "Test" is likely to be the same WAP as the WAP transmitting "Test_5G". In addition, the WAP transmitting "AccessPoint01" is likely to be the same WAP as the WAP transmitting "AccessPoint02".

The controller 180 may remove the letters, numbers, or symbols (e.g., "2.4G" or "2.4 GHz" or "5G" or "5 GHz" Or "01" or "02", etc.) representing the frequency band from the SSID of the selected WAP 200 and other obtained SSID. The controller 180 may determine whether there is another SSID similar to the SSID of the WAP 200 based on the similarity (or identity) between the remaining characters of the SSID (e.g., "Sample" or "Test" or "AccessPoint", etc.). Also, the controller 180 may determine whether the WAP 200 provides wireless communication in the plurality of frequency bands based on whether another SSID similar to the SSID of the WAP 200 exists.

As such, the controller 180 may determine whether the WAP 200 provides wireless communication in the plurality of frequency bands based on the similarity of the SSIDs or the identity of the SSIDs of the WAP 200.

As another example, the controller 180 may determine whether the WAP 200 provides wireless communication in the plurality of frequency bands based on the MAC address of the WAP 200.

The WAP 200 providing the dual band or the multi band may transmit the beacon frames having different BSS IDs (Mac addresses) in the 2.4 GHz band and the 5 GHz band. In addition, the MAC addresses of the WAP 200 in the 2.4 GHz band and the 5 GHz band are generally similar.

The difference between the MAC address of the WAP 200 in the 2.4 GHz band and the MAC address of the WAP 200 in the 5 GHz band may be within ±10, for example.

The controller 180 may determine a difference between the MAC address (BSS ID) of the selected WAP 200 and another obtained MAC address. The controller 180 may determine whether the WAP 200 provides wireless communication in the plurality of frequency bands based on whether there is a first MAC address within ±10 of the difference from the MAC address of the WAP 200. In addition, the controller 180 may determine that a beacon frame including the first MAC address within ±10 of the difference from the MAC address of the selected WAP 200 is transmitted from the selected WAP 200.

As another example, based on a minimum value of the difference between the MAC address of the selected WAP 200 and another obtained MAC address, the controller 180 may estimate whether the WAP 200 provides wireless communication in wireless communication in the plurality of frequency bands. The controller 180 may estimate that a beacon frame including a second MAC address having a minimum difference from the MAC address of the WAP 200 is transmitted from the selected WAP 200.

When the first frequency band is not selected and the selected WAP 200 does not provide wireless communication of the plurality of frequency bands (NO in 1050), the display apparatus 100 may establish wireless communication with the WAP 200 in the selected frequency band (1095).

The display apparatus 100 may establish wireless communication between the WAP 200 and a frequency band other than the first frequency band (hereinafter, referred to as "second frequency band"). For example, the display apparatus 100 may establish wireless communication with the WAP 200 in the 2.4 GHz band.

The controller 180 may control the communication interface 160 to transmit the probe request frame to the selected WAP 200. The controller 180 may display a keyboard for inputting the authentication code in response to reception of the probe response frame of the WAP 200 and may obtain the authentication code depending on the user input. The controller 180 may control the communication interface 160 to transmit the authentication code together with the authentication request. When authentication of the display apparatus 100 is completed by the authentication code, the wireless communication between the display apparatus 100 and the WAP 200 may be established.

When the selected WAP 200 provides wireless communication in the plurality of frequency bands (YES in 1050), the display apparatus 100 may determine whether a signal strength of the first frequency band is greater than or equal to a reference strength (1060).

The wireless communication module 162 may measure the signal strength of the first frequency band and provide the measured signal strength to the controller 180.

The controller 180 may determine whether the signal strength of the first frequency band is greater than or equal to the reference strength based on a comparison between the signal strength of the first frequency band and the reference strength. The reference strength may be set experimentally or empirically. For example, the reference strength may be −78 dBm, for example.

When the signal strength of the first frequency band is less than the reference strength (No in 1060), the display apparatus 100 may establish wireless communication between the WAP 200 and the selected frequency band (the second frequency band) (1095).

When the signal strength of the first frequency band is greater than or equal to the reference strength (YES in 1060), the display apparatus 100 may display a message for guiding selection of the first frequency band (1070).

The controller 180 may determine whether the selected WAP 200 provides wireless communication in the plurality of frequency bands. In other words, the controller 180 may determine whether the WAP 200 providing wireless communication in the second frequency band also provides wireless communication in the first frequency band.

When the WAP 200 selected by the user provides wireless communication of the first frequency band together, the controller 180 may control the display 150 to display the message for guiding the selection of the first frequency band.

For example, as illustrated in FIG. 10, the controller 180 may control the display 150 to display a pop-up window 530 including a message indicating that the wireless communication quality of the first frequency band (e.g., 5 GHz band) is better than wireless communication quality of the second frequency band (e.g., 2.4 GHz band). The pop-up window 530 may include selection buttons 531 and 532 for selecting any one of wireless communication in the first frequency band (e.g., 5 GHz band) and wireless communication in the second frequency band (e.g., 2.4 GHz band).

The display apparatus 100 determines whether the first frequency band is selected (1080).

As illustrated in FIG. 10, the controller 180 may control the display 150 to display the pop-up window 530 for selecting any one of wireless communication in the first frequency band (e.g., 5 GHz band) and wireless communication in the second frequency band (e.g., 2.4 GHz band).

The controller 180 may determine whether the first frequency band has been selected according to the user input.

When the first frequency band is selected (YES in 1080), the display apparatus 100 may establish wireless communication with the WAP 200 in the first frequency band (1090).

When the first frequency band is not selected (NO in 1080), the display apparatus 100 may establish wireless communication in the WAP 200 and the second frequency band (frequency band selected by the user) (1095).

As described above, the display apparatus 100 may establish wireless communication with the WAP 200 through either the first frequency band or the second frequency band, depending on the user's selection. In this case, the first frequency band may be a frequency band having superior wireless communication quality than the second frequency band.

When the user selects wireless communication through the second frequency band, the display apparatus 100 may identify whether the WAP 200 provides wireless communication through the first frequency band. In addition, the display apparatus 100 may inform the user that the quality of wireless communication through the first frequency band is superior to the quality of wireless communication through the second frequency band, and guide selection of wireless communication through the first frequency band.

In this way, by guiding the selection of wireless communication through the first frequency band, the display apparatus 100 may prevent disconnection of wireless communication with the WAP 200. Thereby the display apparatus 100 may prevent disconnection of video streaming.

Figure 11:
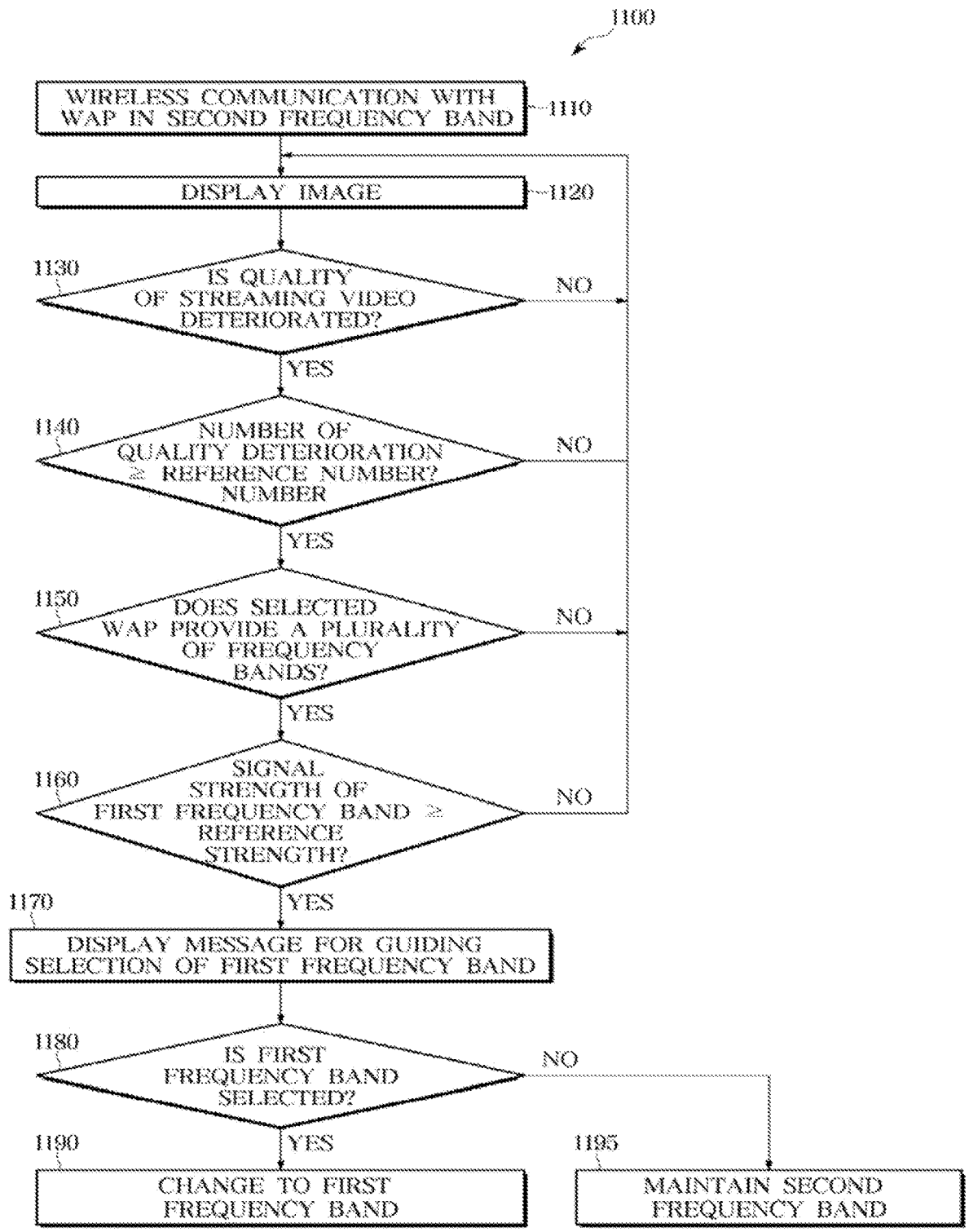
FIG. 11 is a view illustrating a method of changing a frequency band for wireless communication by a display apparatus according to an embodiment.
Figure 12:
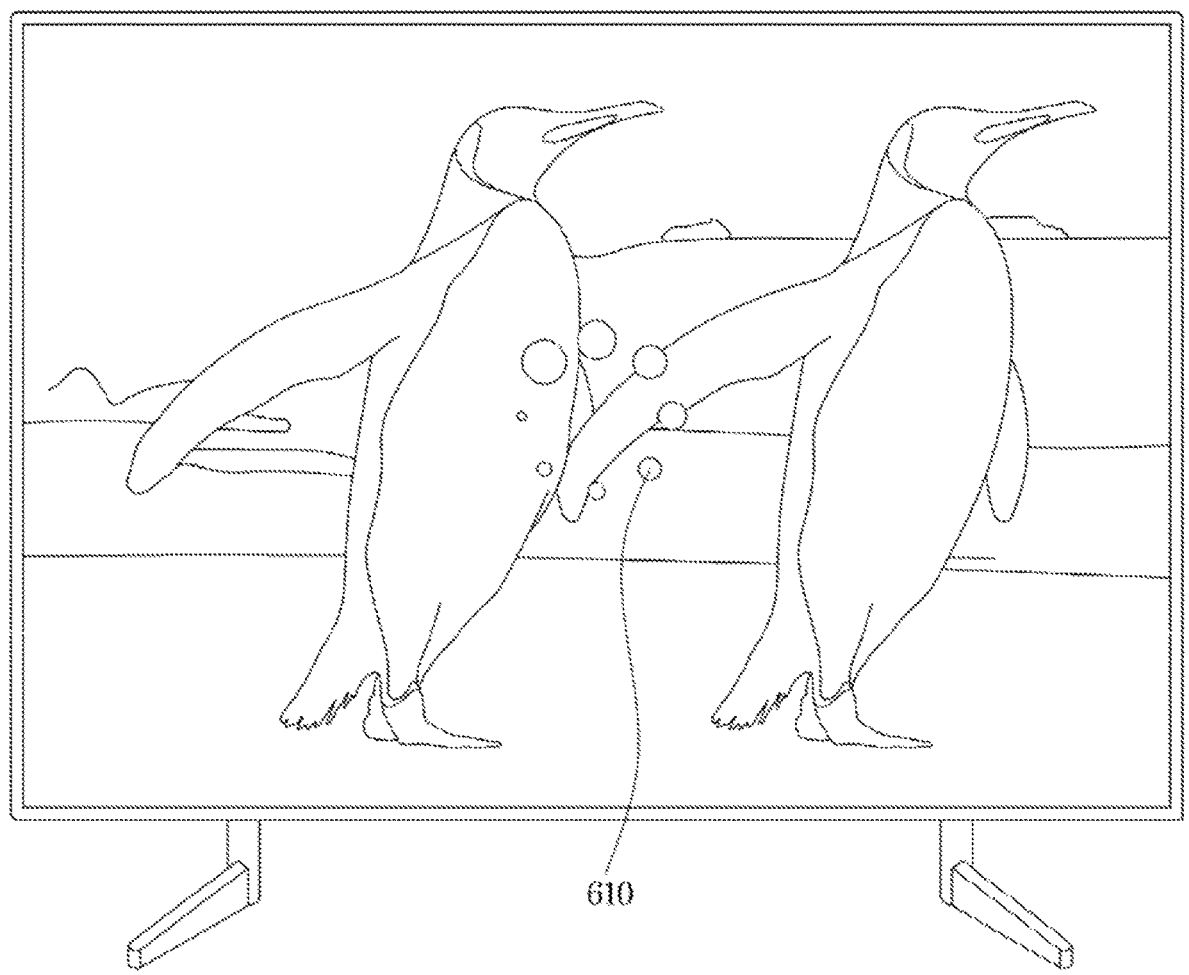
FIG. 12 is a view illustrating a buffering image displayed on a display apparatus according to an embodiment.

FIG. 11 is a view illustrating a method of changing a frequency band for wireless communication by a display apparatus according to an embodiment, and FIG. 12 is a view illustrating a buffering image displayed on a display apparatus according to an embodiment.

Referring to FIGS. 11 and 12, a method 1100 of changing the band of the display apparatus 100 will be described.

The display apparatus 100 may perform wireless communication with the WAP 200 in the second frequency band (1110).

The controller 180 of the display apparatus 100 may select wireless communication using the WAP 200 and the second frequency band (e.g., a 2.4 GHz band) in response to the user input. The controller 180 may establish wireless communication with the WAP 200 in the second frequency band.

The display apparatus 100 may display the image by video streaming (1120).

The controller 180 may receive the data stream for video streaming through wireless communication with the WAP 200. Further, the controller 180 may control the display 150 to display the image by the video streaming.

The controller 180 may decode the data stream received through the wireless communication module 162 and restore the image frame. Further, the controller 180 may control the display 150 to display the image frame.

The display apparatus 100 determines whether or not the quality of the streaming video is deteriorated while displaying the image (1130).

The controller 180 may identify the deterioration of the streaming video based on the key performance indicators such as the frame rate of the video or the resolution of the image. For example, the controller 180 may obtain the resolution of the video and the frame rate of the video from among the metadata included in the data stream, and identify the deterioration of the video quality based on the resolution of the obtained video and the frame rate of the video. Also, the controller 180 may determine the decrease in the frame rate or the decrease in resolution of the video based on the presence or characteristics of the data stream stored in the stream buffer 191.

The controller 180 may determine the quality deterioration of the streaming video based on the fact that the video resolution is less than a reference resolution (e.g., the resolution set by the user or the resolution of an original video). In addition, the controller 180 may determine the quality deterioration of the streaming video based on the fact that the frame rate of the video is less than a reference rate (e.g., the frame rate set by the user or the frame rate of the original video).

The controller 180 may identify buffering as part of the deterioration of the frame rate of the video. Buffering may indicate that the image is stopped for a certain period of time due to a sharp drop in the frame rate due to streaming. For example. The controller 180 may control the display 150 to display an image 610 representing buffering as illustrated in FIG. 12 in response to detection of buffering.

When it is determined that the quality of the streaming video is not deteriorated (NO in 1130), the display apparatus 100 may continue to display the image.

When it is determined that the quality of the streaming video is deteriorated (YES in 1130), the display apparatus 100 may determine whether the number of the video quality deterioration is equal to or greater than a reference number (1140).

When it is determined that the quality of the streaming video is deteriorated, the controller 180 may record a time of deterioration of the quality of the streaming video and determine the number of times of deterioration of the quality of the streaming video within the predetermined time. Also, the controller 180 may identify whether the number of deterioration of video quality is greater than or equal to the reference number, based on a comparison between the number of deterioration in quality of the streaming video within the predetermined time and the reference number.

When the number of video quality deterioration is less than the reference number (NO in 1140), the display apparatus 100 may continue to display the image.

When the number of video quality deterioration is greater than or equal to the reference number (YES in 1140), the display apparatus 100 may determine whether the selected WAP 200 provides wireless communication in the plurality of frequency bands (1150).

Operation 1150 may be the same as operation 1050 illustrated in FIG. 7.

When the selected WAP 200 does not provide wireless communication in the plurality of frequency bands (NO in 1150), the display apparatus 100 may maintain wireless communication in the second frequency band (1195).

When the selected WAP 200 provides wireless communication in the plurality of frequency bands (YES in 1150), the display apparatus 100 may determine whether the signal strength of the first frequency band is greater than or equal to the reference strength (1160).

When the signal strength of the first frequency band is less than the reference strength (NO in 1160), the display apparatus 100 may maintain wireless communication in the second frequency band (1195).

Operation 1160 may be the same as operation 1060 illustrated in FIG. 7.

When the signal strength of the first frequency band is greater than or equal to the reference strength (YES in 1160), the display apparatus 100 may display the message for guiding selection of the first frequency band (1170).

The controller 180 may determine whether the currently connected WAP 200 provides wireless communication in the first frequency band as well as the second frequency band. When the WAP 200 provides wireless communication in the first frequency band together, the controller 180 may the display 150 may control the display 150 to display the message for guiding selection of the first frequency band. For example, the controller 180 may control the display 150 to display the pop-up window 530 described above with reference to FIG. 10. The pop-up window 530 may include the selection button 531 for selecting any one of wireless communication in the first frequency band (e.g., 5 GHz band) and wireless communication in the second frequency band (e.g., 2.4 GHz band).

The display apparatus 100 determines whether the first frequency band is selected (1180).

Operations 1170 and 1180 may be the same as operations 1070 and 1080 illustrated in FIG. 7.

When the first frequency band is selected (YES in 1180), the display apparatus 100 may establish wireless communication with the WAP 200 in the first frequency band (1190).

The controller 180 may terminate wireless communication with the WAP 200 in the second frequency band in response to the selection of the first frequency band, and establish wireless communication with the WAP 200 in the first frequency band.

When the first frequency band is not selected (NO in 1180), the display apparatus 100 may continue wireless communication with the WAP 200 in the second frequency band (1195).

As described above, the display apparatus 100 may identify the quality deterioration of the streaming video during wireless communication with the WAP 200 in the second frequency band, and change the frequency band for wireless communication to the first frequency band in response to the quality deterioration of the streaming video.

In this way, by changing the wireless communication in the second frequency band to the wireless communication in the first frequency band, the display apparatus 100 may prevent disconnection of wireless communication with the WAP 200. Thereby the display apparatus 100 may prevent disconnection of video streaming.

Figure 13:
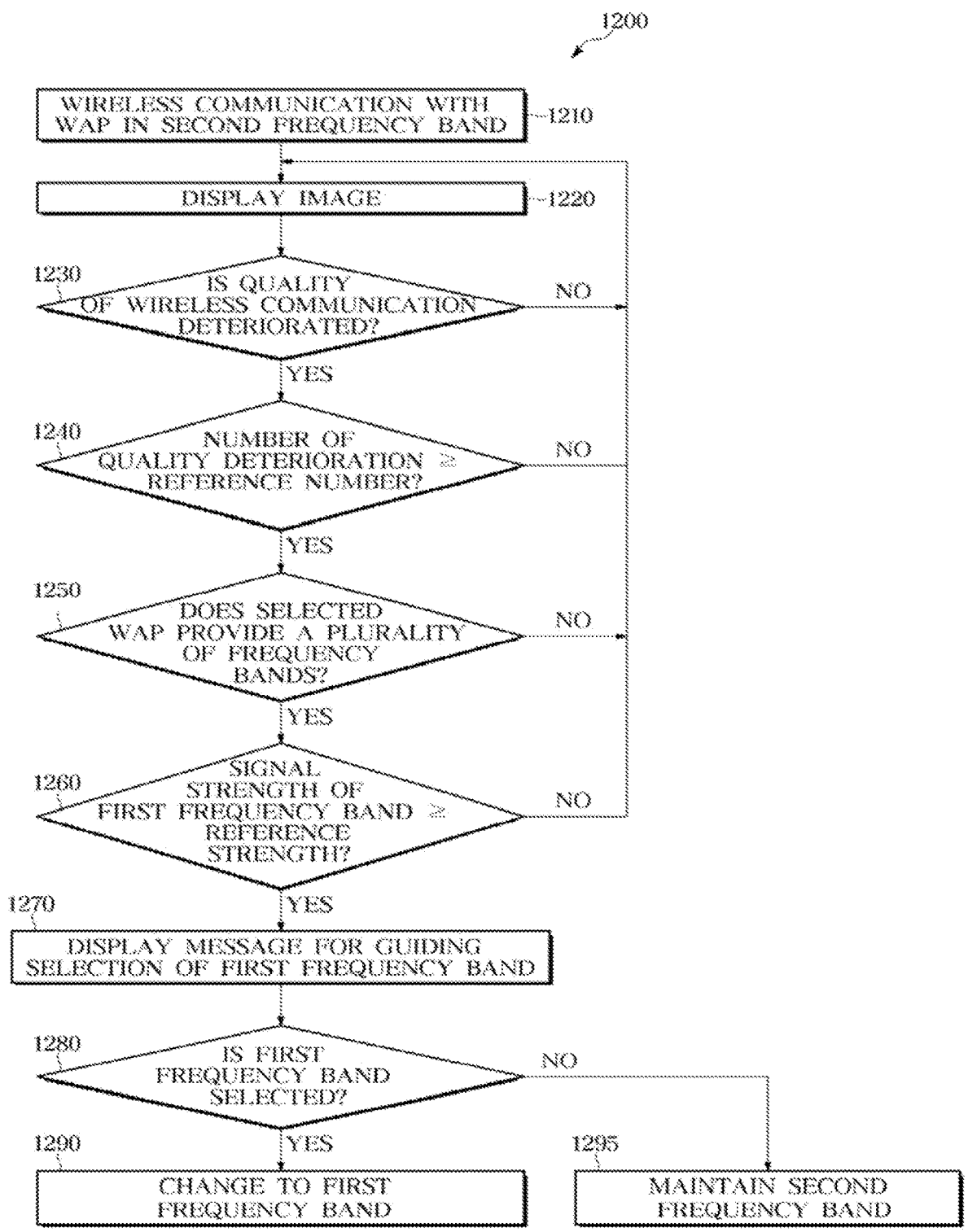
FIG. 13 is a view illustrating a method of changing a frequency band for wireless communication by a display apparatus according to an embodiment.

FIG. 13 is a view illustrating a method of changing a frequency band for wireless communication by a display apparatus according to an embodiment.

Referring to FIG. 13, a method 1200 of changing the band of the display apparatus 100 will be described.

The display apparatus 100 may perform wireless communication with the WAP 200 in the second frequency band (1210).

The display apparatus 100 may display the image by video streaming (1220).

Operations 1210 and 1220 may be the same as operations 1110 and 1120 illustrated in FIG. 11.

The display apparatus 100 may determine whether or not the quality of wireless communication is deteriorated while displaying the image (1230).

The quality deterioration of wireless communication between the display apparatus 100 and the WAP 200 may be due to wireless communication interference, out of range of communication, and communication obstacles. For example, the bandwidth of the second frequency band (2.4 GHz band) is narrower than the bandwidth of the first frequency band (5 GHz band), and the channel of the second frequency band (2.4 GHz band) is less than the channel of the first frequency band (5 GHz band). Accordingly, it can be determined that the quality deterioration of wireless communication between the display apparatus 100 and the WAP 200 is mainly caused by wireless communication interference within the second frequency band.

The controller 180 may identify the decrease in RSSI, the decrease in data rate, and the increase in retry rate in order to identify the deterioration in wireless communication quality.

For example, the wireless communication module 162 may measure the strength of the received signal, the data rate, and the data retry rate during wireless communication with the WAP 200, and provide the measured strength of the received signal, the data rate, and the data retry rate to the controller 180.

The controller 180 may determine the quality deterioration of wireless communication based on the strength of the received signal being less than or equal to the reference strength. The controller 180 may determine the quality deterioration of wireless communication based on the data rate being less than or equal to a reference data rate. In addition, the controller 180 may determine the quality deterioration of wireless communication based on the data retry rate being equal to or greater than a reference retry rate.

When it is determined that the quality of wireless communication is deteriorated (YES in 1230), the display apparatus 100 may determines whether the number of the video quality deterioration is equal to or greater than the reference number (1240).

When the number of video quality deterioration is less than the reference number (NO in 1240), the display apparatus 100 may continue to display the image.

When the number of video quality deterioration is greater than or equal to the reference number (YES in 1240), the display apparatus 100 may determine whether the selected WAP 200 provides wireless communication in the plurality of frequency bands (1250).

When the selected WAP 200 does not provide wireless communication in the plurality of frequency bands (NO in 1250), the display apparatus 100 may maintain wireless communication in the second frequency band (1295).

When the selected WAP 200 provides wireless communication in the plurality of frequency bands (YES in 1250), the display apparatus 100 may determine whether the signal strength of the first frequency band is greater than or equal to the reference strength (1260).

When the signal strength of the first frequency band is less than the reference strength (NO in 1260), the display apparatus 100 may maintain wireless communication in the second frequency band (1295).

When the signal strength of the first frequency band is greater than or equal to the reference strength (YES in 1260), the display apparatus 100 may display the message for guiding selection of the first frequency band (1270).

The display apparatus 100 determines whether the first frequency band is selected (1280).

When the first frequency band is selected (YES in 1280), the display apparatus 100 may establish wireless communication with the WAP 200 in the first frequency band (1290).

When the first frequency band is not selected (NO in 1280), the display apparatus 100 may continue wireless communication with the WAP 200 in the second frequency band (1295).

Operation 1240, operation 1250, operation 1260, operation 1270, operation 1280, operation 1290, and operation 1295 are the same as operation 1140, operation 1150, operation 1160, operation 1170, operation 1180, operation 1190 and operation 1195 illustrated in FIG. 11.

As described above, the display apparatus 100 may identify the quality deterioration of the wireless communication during wireless communication with the WAP 200 in the second frequency band, and change the frequency band for wireless communication to the first frequency band in response to the quality deterioration of the wireless communication.

In this way, by changing the wireless communication in the second frequency band to the wireless communication in the first frequency band, the display apparatus 100 may prevent disconnection of wireless communication with the WAP 200. Thereby the display apparatus 100 may prevent disconnection of video streaming.

Figure 14:
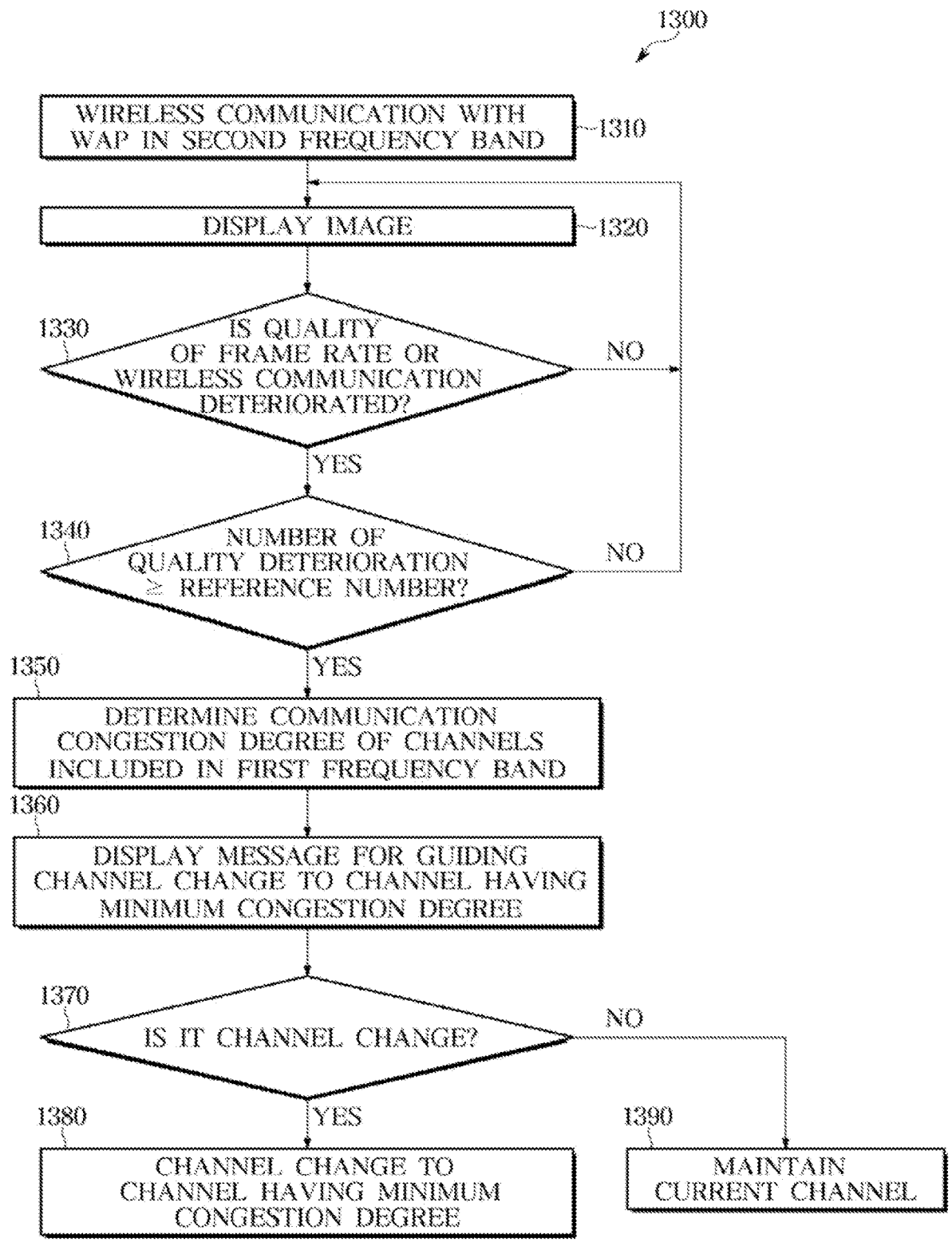
FIG. 14 is a view illustrating a method of changing a frequency band for wireless communication by a display apparatus according to an embodiment.
Figure 15:
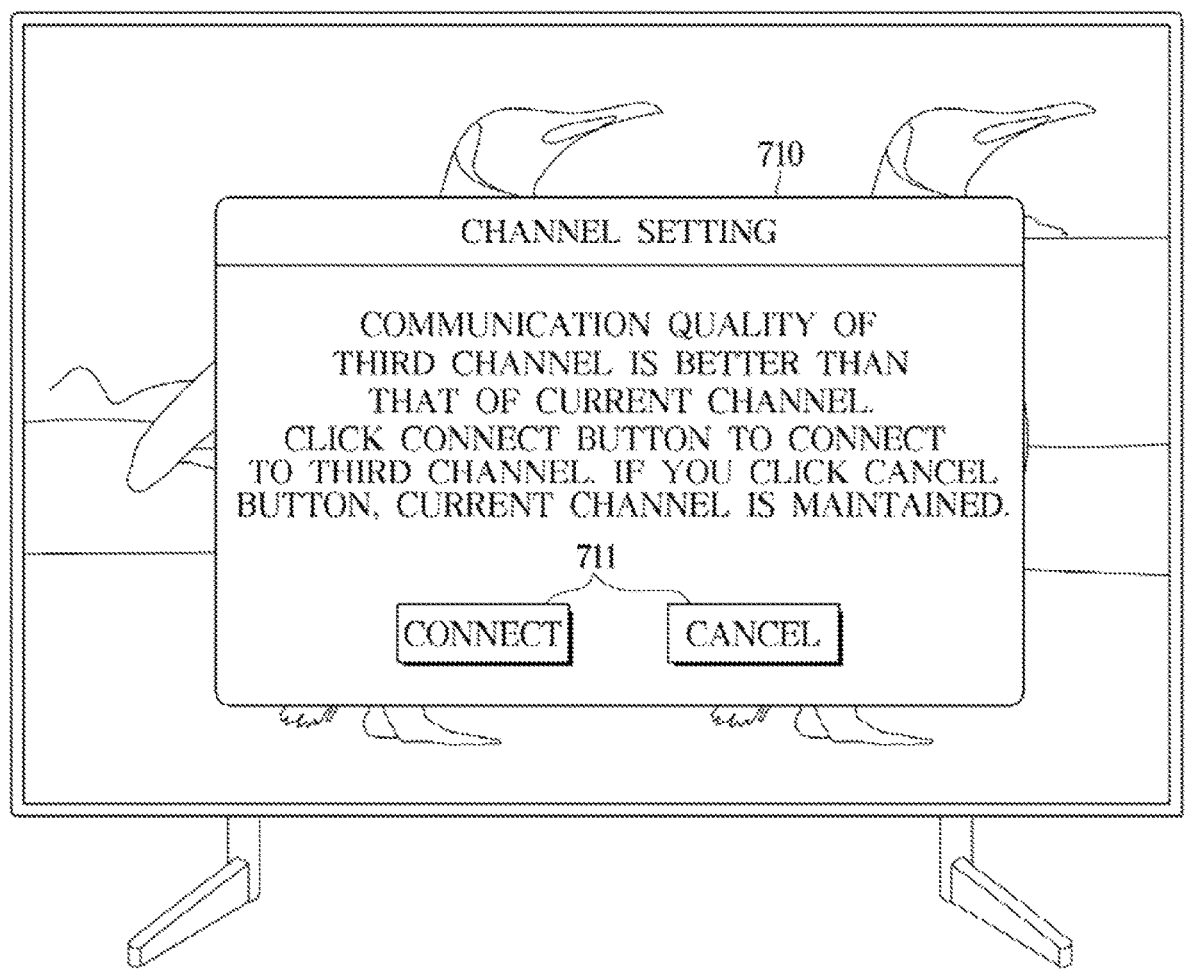
FIG. 15 is a view illustrating a pop-up window for changing a channel for wireless communication by a display apparatus according to an embodiment.

FIG. 14 is a view illustrating a method of changing a frequency band for wireless communication by a display apparatus according to an embodiment, and FIG. 15 is a view illustrating a pop-up window for changing a channel for wireless communication by a display apparatus according to an embodiment.

Referring to FIGS. 14 and 15, a method 1300 of changing the band of the display apparatus 100 will be described.

The display apparatus 100 may perform wireless communication with the WAP 200 in the first frequency band (1310).

The controller 180 of the display apparatus 100 may select wireless communication using the WAP 200 and the first frequency band (e.g., a 5 GHz band) in response to the user input. The controller 180 may establish wireless communication with the WAP 200 in the first frequency band.

The display apparatus 100 may display the image by video streaming (1320).

Operation 1320 may be the same as operation 1120 illustrated in FIG. 11.

While displaying the image, the display apparatus 100 may determine whether the quality of the streaming video is deteriorated or whether the quality of the wireless communication is deteriorated (1330).

The controller 180 may identify the quality deterioration of the streaming video based on the key performance indicators such as the frame rate of the video or the resolution of the image, and identify the quality deterioration of wireless communication based on the key performance indicators such as the RSSI, the data rate, or the retry rate.

Operation 1330 may be the same as operation 1130 illustrated in FIG. 11 and operation 1230 illustrated in FIG. 13.

When the quality deterioration of the streaming video or the quality deterioration of the wireless communication is not determined (NO in 1330), the display apparatus 100 may continue to display the image.

When it is determined that the quality of the streaming video is deteriorated or the quality of the wireless communication is deteriorated (YES in 1330), the display apparatus 100 may determine whether the number of the video quality deterioration is equal to or greater than the reference number (1340).

Operation 1340 may be the same as operation 1140 illustrated in FIG. 11.

When the number of video quality deterioration is less than the reference number (NO in 1340), the display apparatus 100 may continue to display the image.

When the number of video quality deterioration is greater than or equal to the reference number (YES in 1340), the display apparatus 100 may determine a congestion degree of channels included in the first frequency band (1350).

The controller 180 of the display apparatus 100 may receive the beacon frames from the plurality of WAPs through the communication interface 160. The WAP may be transmitted through the specific channel. For example, the first WAP may periodically transmit the beacon frame through the first channel, and may wirelessly communicate with other devices through the first channel. The second WAP may periodically transmit the beacon frame through the second channel, and may wirelessly communicate with other devices through the second channel.

Accordingly, the controller 180 may determine that wireless communication between the WAP and another device is performed on the channel on which the beacon frame is received. In other words, the controller 180 may determine that the channel on which the beacon frame is received is previously occupied by another device. Also, the controller 180 may determine that the channel through which a plurality of different beacon frames are received is occupied by a plurality of different devices.

The controller 180 may determine the congestion degree of a corresponding channel based on the number of different beacon frames received in one channel. The controller 180 may determine that a channel in which two different beacon frames are received is more congested than a channel in which one beacon frame is received. For example, the controller 180 may determine the congestion degree of a channel in which two different beacon frames are received as "2", and determine the congestion degree of a channel in which one beacon frame is received as "1". In this way, the controller 180 may determine the congestion degree of all channels included in the first frequency band.

The display apparatus 100 may display a message for guiding a channel change to a channel having a minimum congestion degree (1360).

The controller 180 may determine the congestion degree of all channels included in the first frequency band and determine the channel having the minimum congestion degree. In addition, the controller 180 may control the display 150 to display the message for guiding the channel change to the channel having the minimum congestion degree.

For example, the controller 180 may control the display 150 to display a pop-up window 710 including a message indicating that the wireless communication quality of another channel is superior to the wireless communication quality of the current channel, as illustrated in FIG. 15. The pop-up window 710 may include a selection button 711 for selecting one of wireless communication of another channel and wireless communication of a current channel.

The display apparatus 100 may determine whether to change the channel (1370).

As illustrated in FIG. 15, the controller 180 may control the display 150 to display the pop-up window 710 for selecting one of wireless communication of another channel and wireless communication of the current channel.

The controller 180 may determine whether or not a change of the communication channel is selected depending on the user's selection.

When the change of the communication channel is selected (YES in 1370), the display apparatus 100 may change the channel to the channel having the minimum congestion degree (1380).

The controller 180 may obtain administrator identification information and an administrator authentication code of the WAP 200 from the user in order to change the communication channel. For example, the controller 180 may control the display 150 to display a pop-up window for obtaining the administrator identification information and the administrator authentication code of the WAP 200 from the user.

The controller 180 may obtain administrator authority by moving to a setting page of the WAP 200 and inputting administrator identification information and administrator authentication code of the WAP 200. Thereafter, the controller 180 may request the WAP to change the channel to the channel having the minimum congestion degree.

In response to the channel change request, the WAP 200 may change the communication channel to the channel having the minimum congestion degree.

The display apparatus 100 may perform wireless communication with the WAP 200 through the changed channel.

When the change of the communication channel is not selected (YES in 1370), the display apparatus 100 may maintain the current communication channel (1390).

The display apparatus 100 may continue wireless communication with the WAP 200 through the current channel.

As described above, the display apparatus 100 may identify the quality deterioration of the streaming video or the quality deterioration of the wireless communication in the first frequency band, and may change the communication channel for wireless communication to the communication channel having the minimum congestion degree, in response to the quality deterioration of the streaming video or the quality deterioration of the wireless communication.

In this way, by changing the communication channel, the display apparatus 100 may prevent disconnection of wireless communication with the WAP 200. Thereby, the display apparatus 100 may prevent the disconnection of video streaming.

As described above, the display apparatus may include a display; a wireless communication module configured to wirelessly communicate in a first frequency band or a second frequency band; and a controller configured to control the wireless communication module to search for a radio signal transmitted from the WAP, to control the display to display identification information included in each of a plurality of radio signals received by the wireless communication module, and to display a message for guiding wireless communication with the WAP in the first frequency band on the display based on the user's selection of wireless communication with the WAP in the second frequency band.

In this way, the display apparatus may recommend wireless communication in the specific frequency band to the user. For example, the display apparatus may recommend wireless communication in the frequency band with excellent wireless communication quality to the user. Thereby, the display apparatus may prevent disconnection of the wireless communication, and further prevent disconnection of the video streaming.

The controller may be configured to determine whether the WAP provides wireless communication in the first frequency band and wireless communication in the second frequency band, based on the identification information included in each of the plurality of radio signals.

In this way, the display apparatus may determine whether the WAP provides wireless communication in the plurality of frequency bands based on the identification information of the WAP. Thereby, the display apparatus may determine whether the WAP provides wireless communication in the first frequency band and wireless communication in the second frequency band with only information provided from the WAP before establishing wireless communication with the WAP.

The controller may be configured to determine whether the WAP provides wireless communication in the first frequency band and wireless communication in the second frequency band, based on the similarity between service set identifiers (SSIDs) included in the plurality of radio signals. The controller may be configured to determine whether the SSIDs from which letters, numbers or symbols representing a frequency band have been removed from the SSID are the same between each other, and to determine whether the WAP provides wireless communication in the first frequency band and wireless communication in the second frequency band.

Thereby, the display apparatus may determine whether the WAP provides wireless communication in the first frequency band and wireless communication in the second frequency band only with the SSID broadcast from the WAP, without requesting additional information from the WAP. In addition, the display apparatus may quickly determine whether the WAP provides wireless communication in the first frequency band and wireless communication in the second frequency band.

The controller may be configured to determine whether the WAP provides wireless communication in the first frequency band and wireless communication in the second frequency band, based on a difference between media access control (MAC) addresses included in each of the plurality of radio signals. The controller may be configured to determine whether the difference between the MAC addresses included in each of the plurality of radio signals is less than a predetermined reference value, and to determine whether the WAP provides wireless communication in the first frequency band and wireless communication in the second frequency band.

Thereby, the display apparatus may determine whether the WAP provides wireless communication in the first frequency band and wireless communication in the second frequency band only with the MAC addresses broadcast from the WAP, without requesting additional information from the WAP. In addition, the display apparatus may quickly determine whether the WAP provides wireless communication in the first frequency band and wireless communication in the second frequency band.

The controller may be configured to control the wireless communication module to wirelessly communicate with the WAP in the second frequency band in response to a user input, and to display a message for guiding wireless communication with the WAP in the first frequency band on the display, in response to a deterioration in video quality or a deterioration in communication quality during wireless communication with the WAP in the second frequency band.

As described above, even if the user adheres to wireless communication in the specific frequency band, the display apparatus may recommend wireless communication in the frequency band having excellent wireless communication quality in response to the deterioration in wireless communication quality. Thereby, the display apparatus may provide the user with a fundamental solution to the deterioration of wireless communication quality.

The controller may be configured to control the wireless communication module to wirelessly communicate with the WAP in the first frequency band in response to a user input, and to display a message for guiding wireless communication with the WAP in a different channel of the first frequency band on the display, in response to a deterioration in video quality or a deterioration in communication quality during wireless communication with the WAP in the first frequency band.

As such, the display apparatus may recommend changing to a new channel depending on the quality of wireless communication. Thereby, the display apparatus may provide the user with the fundamental solution to the deterioration of wireless communication quality.

According to the display apparatus and the method of controlling the display apparatus according to the embodiments, it is possible to guide the user's selection to perform wireless communication in the frequency band for optimal wireless communication based on the quality of wireless communication.

According to the display apparatus and the method of controlling the display apparatus according to the embodiments, it is possible to change the frequency band for wireless communication in response to a decrease in quality of wireless communication.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

While various example embodiments of the disclosure have been illustrated and described with reference to the accompanying drawings, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A display apparatus comprising:
   a display;
   a communication interface configured to wirelessly communicate in a first frequency band or a second frequency band; and
   a controller configured to:
      control the communication interface to search for a radio signal transmitted from a wireless access point (WAP),
      control the display to display identification information included in each of a plurality of radio signals received by the communication interface, the radio signal being one of the plurality of radio signals, and the identification information including identification information of the WAP providing wireless communication in the first frequency band and identification information of the WAP providing wireless communication in the second frequency band, and
      in response to a user selecting the wireless communication with the WAP in the second frequency band, control the display to display a message for guiding the wireless communication with the WAP in the first frequency band.

2. The display apparatus according to claim 1, wherein the controller is configured to determine whether the WAP provides the wireless communication in the first frequency band and the wireless communication in the second frequency band, based on the identification information included in each of the plurality of radio signals.

3. The display apparatus according to claim 2, wherein the controller is configured to determine whether the WAP provides the wireless communication in the first frequency band and the wireless communication in the second frequency band, based on a similarity between service set identifiers (SSIDs) included in the plurality of radio signals.

4. The display apparatus according to claim 3, wherein the controller is configured to:
   determine whether the SSIDs from which letters, numbers or symbols representing a frequency band have been removed from the SSID are the same between each other; and
   determine whether the WAP provides the wireless communication in the first frequency band and the wireless communication in the second frequency band.

5. The display apparatus according to claim 2, wherein the controller is configured to determine whether the WAP provides the wireless communication in the first frequency band and the wireless communication in the second frequency band, based on a difference between media access control (MAC) addresses included in each of the plurality of radio signals.

6. The display apparatus according to claim 5, wherein the controller is configured to:
   determine whether the difference between the MAC addresses included in each of the plurality of radio signals is less than a predetermined reference value; and
   determine whether the WAP provides the wireless communication in the first frequency band and the wireless communication in the second frequency band.

7. The display apparatus according to claim 1, wherein the controller is configured to:
   control the communication interface to wirelessly communicate with the WAP in the second frequency band in response to a user input; and
   display a message for guiding the wireless communication with the WAP in the first frequency band on the display, in response to a deterioration in video quality or a deterioration in communication quality during the wireless communication with the WAP in the second frequency band.

8. The display apparatus according to claim 7, wherein:
the deterioration in video quality comprises a decrease in a frame rate of a video or a decrease in a resolution of the video; and
the deterioration in communication quality comprises a decrease in received signal strength indicator (RSSI), a decrease in data rate, or an increase in data retry rate.

9. The display apparatus according to claim 1, wherein the controller is configured to:
control the communication interface to wirelessly communicate with the WAP in the first frequency band in response to a user input; and
display a message for guiding the wireless communication with the WAP in a different channel of the first frequency band on the display, in response to a deterioration in video quality or a deterioration in communication quality during the wireless communication with the WAP in the first frequency band.

10. A method of controlling a display apparatus wirelessly communicating in a first frequency band or a second frequency band, the method comprising:
searching, by a controller of the display apparatus, for a radio signal transmitted from a wireless access point (WAP);
displaying, on a display of the display apparatus by the controller, identification information included in each of a plurality of radio signals received by a communication interface of the display apparatus, the radio signal being one of the plurality of radio signals, and the identification information including identification information of the WAP providing wireless communication in the first frequency band and identification information of the WAP providing wireless communication in the second frequency band; and
in response to a user selecting the wireless communication with the WAP in the second frequency band, displaying, on the display by the controller, a message for guiding the wireless communication with the WAP in the first frequency band.

11. The method according to claim 10, further comprising:
determining, by the controller, whether the WAP provides the wireless communication in the first frequency band and the wireless communication in the second frequency band, based on the identification information included in each of the plurality of radio signals.

12. The method according to claim 11, wherein the determining whether the WAP provides the wireless communication in the first frequency band and the wireless communication in the second frequency band further comprises:
determining whether the WAP provides the wireless communication in the first frequency band and the wireless communication in the second frequency band, based on a similarity between service set identifiers (SSIDs) included in the plurality of radio signals.

13. The method according to claim 12, wherein the determining whether the WAP provides the wireless communication in the first frequency band and the wireless communication in the second frequency band further comprises:
determining whether the SSIDs from which letters, numbers or symbols representing a frequency band have been removed from the SSID are the same between each other; and
determining whether the WAP provides the wireless communication in the first frequency band and the wireless communication in the second frequency band.

14. The method according to claim 11, wherein the determining whether the WAP provides the wireless communication in the first frequency band and the wireless communication in the second frequency band further comprises:
determining whether the WAP provides the wireless communication in the first frequency band and the wireless communication in the second frequency band, based on a difference between media access control (MAC) addresses included in each of the plurality of radio signals.

15. The method according to claim 14, wherein the determining whether the WAP provides the wireless communication in the first frequency band and the wireless communication in the second frequency band further comprises:
determining whether the difference between the MAC addresses included in each of the plurality of radio signals is less than a predetermined reference value; and
determining whether the WAP provides the wireless communication in the first frequency band and the wireless communication in the second frequency band.

16. The method according to claim 10, further comprising:
controlling, by the controller, the communication interface to wirelessly communicate with the WAP in the second frequency band in response to a user input; and
displaying, by the controller, a message for guiding the wireless communication with the WAP in the first frequency band on the display, in response to a deterioration in video quality or a deterioration in communication quality during the wireless communication with the WAP in the second frequency band.

17. The method according to claim 16, wherein:
the deterioration in video quality comprises a decrease in a frame rate of a video or a decrease in a resolution of the video; and
the deterioration in communication quality comprises a decrease in received signal strength indicator (RSSI), a decrease in data rate, or an increase in data retry rate.

18. The method according to claim 10, further comprising:
controlling, by the controller, the communication interface to wirelessly communicate with the WAP in the first frequency band in response to a user input; and
displaying, by the controller, a message for guiding the wireless communication with the WAP in a different channel of the first frequency band on the display, in response to a deterioration in video quality or a deterioration in communication quality during the wireless communication with the WAP in the first frequency band.

19. A display apparatus comprising:
a display;
a communication interface configured to wirelessly communicate in a first frequency band or a second frequency band; and
a controller configured to:

control the communication interface to search for a radio signal transmitted from a wireless access point (WAP), control the display to display identification information included in each of a plurality of radio signals received by the communication interface, the radio signal being one of the plurality of radio signals, and the identification information including identification information of the WAP providing wireless communication in the first frequency band and identification information of the WAP providing wireless communication in the second frequency band, control the communication interface to wirelessly communicate with the WAP in the second frequency band in response to a user input, determine whether the WAP provides wireless communication in the first frequency band and wireless communication in the second frequency band based on identification information included in each of a plurality of wireless signals, in response to a deterioration in video quality or a deterioration in communication quality during the wireless communication with the WAP in the second frequency band, and display a message for guiding the wireless communication with the WAP in the first frequency band on the display.

20. The display apparatus according to claim 19, wherein the controller is configured to determine whether the WAP provides the wireless communication in the first frequency band and the wireless communication in the second frequency band, based on a similarity between service set identifiers (SSIDs) included in the plurality of radio signals or a difference between media access control (MAC) addresses included in each of the plurality of radio signals.

21. The display apparatus according to claim 1, wherein the controller is further configured to, in response to the user selecting the wireless communication with the WAP in the second frequency band and a signal strength of the first frequency band being greater than or equal to a reference signal strength, control the display to display the message for guiding the wireless communication with the WAP in the first frequency band.

22. The method according to claim 10, wherein the displaying the message for guiding the wireless communication with the WAP in the first frequency band comprises, in response to the user selecting the wireless communication with the WAP in the second frequency band and a signal strength of the first frequency band being greater than or equal to a reference signal strength, displaying the message for guiding the wireless communication with the WAP in the first frequency band.

\* \* \* \* \*